US012580368B2

(12) United States Patent
O'Connell

(10) Patent No.: US 12,580,368 B2
(45) Date of Patent: Mar. 17, 2026

(54) ANTI-ROTATION DEVICE FOR CABLE STRINGING

(71) Applicant: Quanta Associates, L.P., Houston, TX (US)

(72) Inventor: Daniel Neil O'Connell, Oliver (CA)

(73) Assignee: Quanta Associates, L.P., Houston, TX (US)

( * ) Notice: Subject to any disclaimer, the term of this patent is extended or adjusted under 35 U.S.C. 154(b) by 167 days.

(21) Appl. No.: 18/627,851

(22) Filed: Apr. 5, 2024

(65) Prior Publication Data

US 2024/0258773 A1    Aug. 1, 2024

Related U.S. Application Data

(63) Continuation-in-part of application No. 17/127,662, filed on Dec. 18, 2020, now Pat. No. 11,979,007.

(60) Provisional application No. 62/951,920, filed on Dec. 20, 2019.

(30) Foreign Application Priority Data

Dec. 20, 2019    (CA) .................................. CA3065714

(51) Int. Cl.
| | |
|---|---|
| *H02G 1/04* | (2006.01) |
| *H02G 1/02* | (2006.01) |
| *H02G 7/18* | (2006.01) |

(52) U.S. Cl.
CPC ................. *H02G 1/04* (2013.01); *H02G 1/02* (2013.01); *H02G 7/18* (2013.01)

(58) Field of Classification Search
CPC ............... H02G 1/02; H02G 7/18; H02G 1/04
See application file for complete search history.

(56) References Cited

U.S. PATENT DOCUMENTS

| | | | | | |
|---|---|---|---|---|---|
| 2,663,748 | A | * | 12/1953 | Carr ........................ | F16G 11/06 |
| | | | | | 254/134.3 R |
| 3,011,765 | A | * | 12/1961 | Sherman .................. | H02G 1/04 |
| | | | | | 254/134.3 R |
| 4,805,878 | A | * | 2/1989 | Dickey .................... | H02G 1/04 |
| | | | | | 254/134.3 R |

OTHER PUBLICATIONS

GB2167246, Stringing Overhead Flexible Electric Conductors; Williams; Published May 21, 1985 (Year: 1985).*

(Continued)

*Primary Examiner* — Steven T Sawyer
(74) *Attorney, Agent, or Firm* — Oathout Law Firm; Antony C. Edwards

(57) ABSTRACT

An anti-rotation device is provided for stringing a cable or wire while reducing a twisting moment of the cable or wire as it is strung. The device includes a tow component, having multiple tow sections pivotally connectable end-to-end. A plurality of electrically insulated weighted tails are suspended so as to hang from the tow component. Each of the tails includes weighted tail sections releasably connectable end-to-end to one another. At least one electrically insulated tail section is provided in each tail between the tow component and at least some of the weighted tail sections. The tails are constrained to only articulate relative to the tow component in the single plane of bending of the tow component.

15 Claims, 24 Drawing Sheets

(56)          References Cited

OTHER PUBLICATIONS

CN108365562; Two-stage Balance Weight Traction Device with Adjustable Distance; Feng; Published Aug. 3, 2018 (Year: 2018).*

Tsimiklis, Francesca, Canada Examiner's Requisition regarding Canadian patent application No. 3,065,714, Jan. 30, 2024, 7 pages, CIPO, Canada.

Tsimiklis, Francesca, Canada Examiner's Requisition regarding Canadian patent application No. 3,065,714, Jan. 31, 2024, 8 pages, CIPO, Canada.

* cited by examiner

SECTION A-A

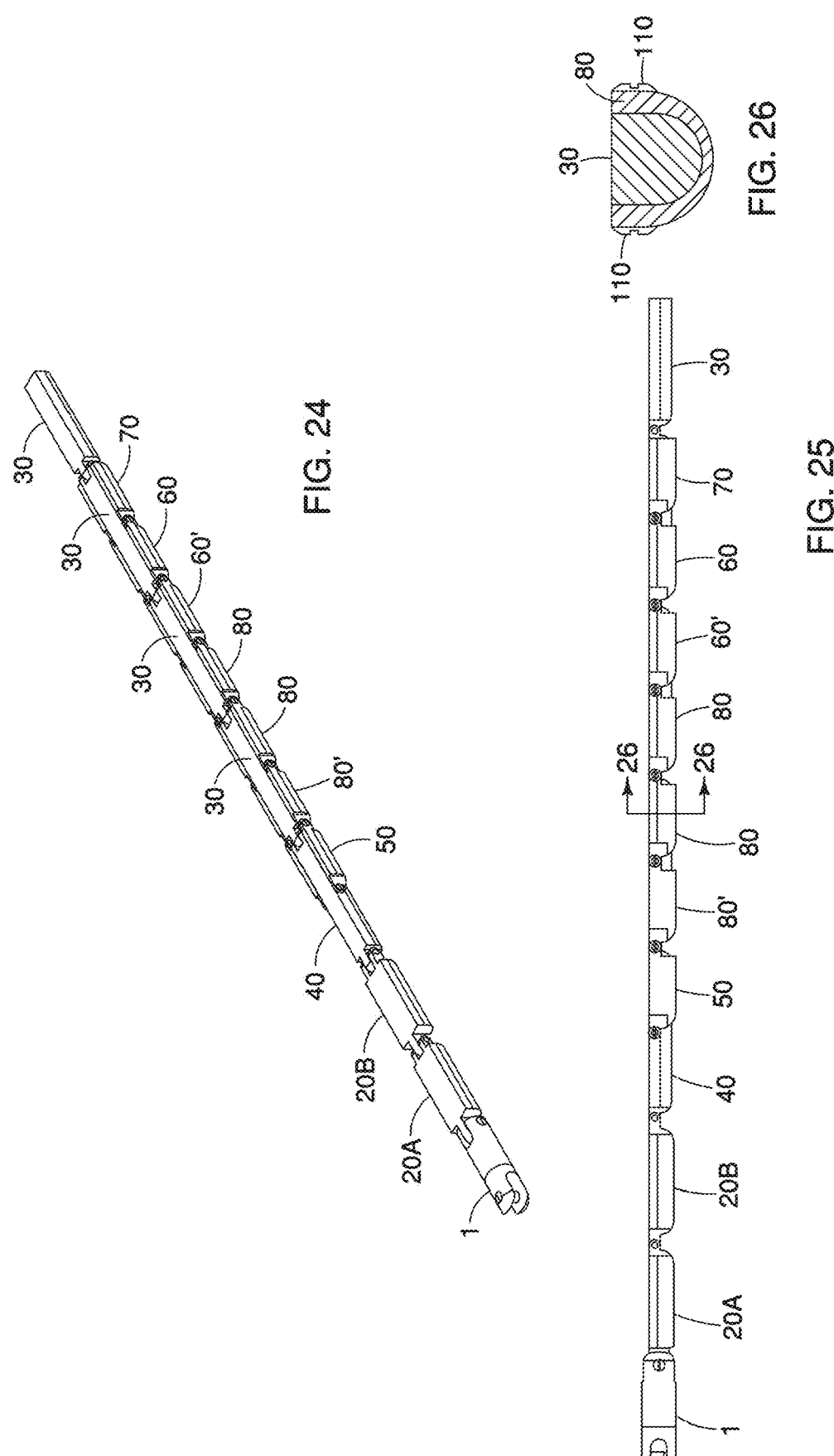

40

29D

29D

40

40

40

40

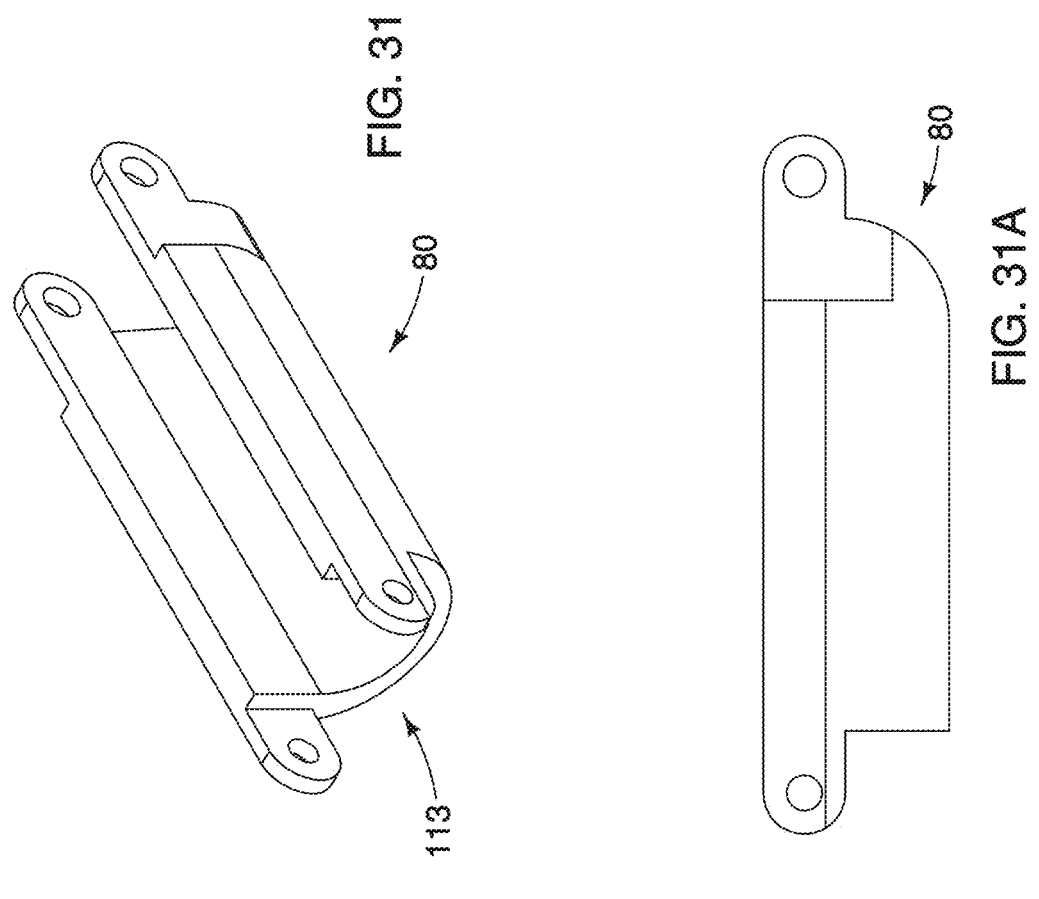
FIG. 31
FIG. 31A
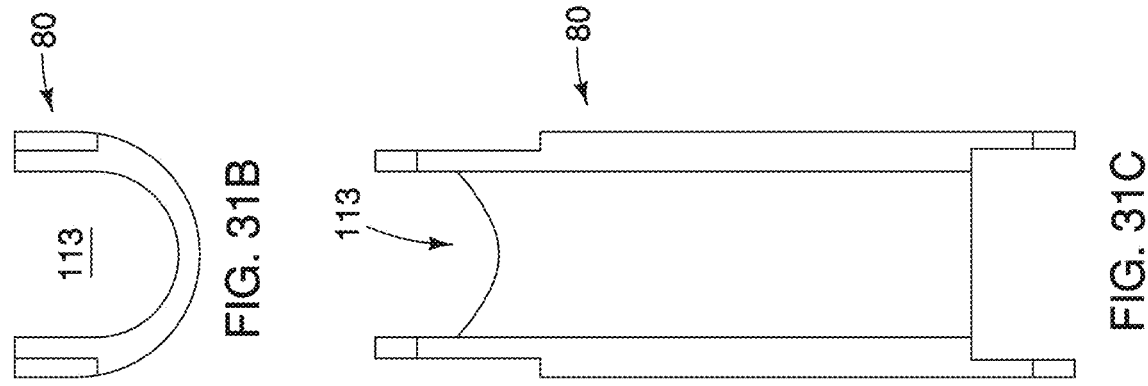
FIG. 31B
FIG. 31C

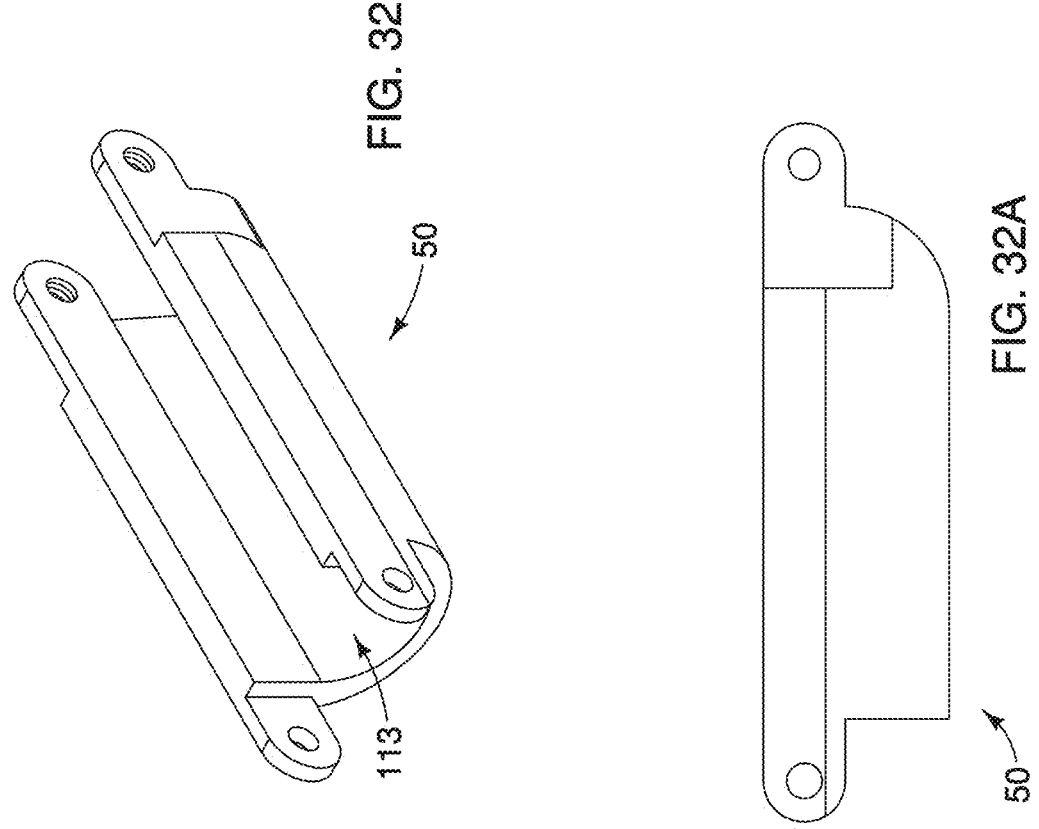
FIG. 32
FIG. 32A
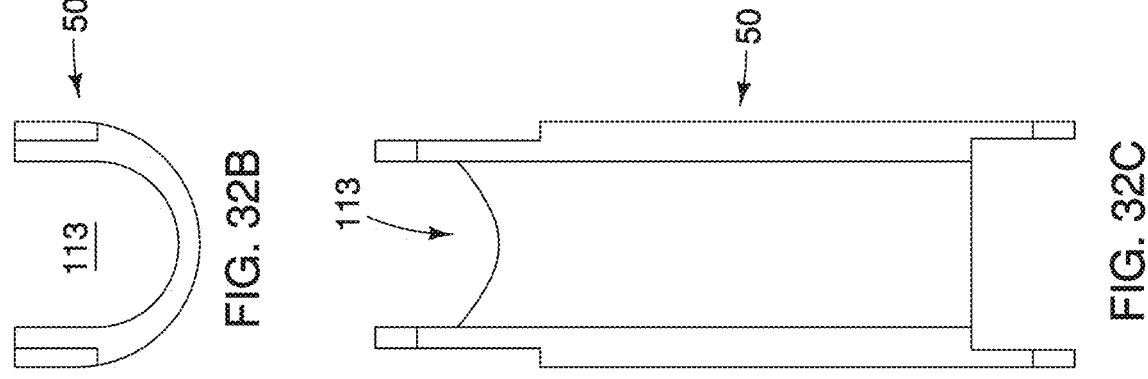
FIG. 32B
FIG. 32C

ANTI-ROTATION DEVICE FOR CABLE STRINGING

TECHNICAL FIELD

The present disclosure relates to a device to assist with resisting twisting of a cable or wire while stringing the cable along an electrical power transmission/distribution network and to protect workers and equipment by insulating the cable and pulling line if the anti-rotation device tails accidentally contact an energized powerline.

BACKGROUND

Conductive and non-conductive cables are typically strung and installed along electrical power transmission/distribution networks. These cables are often formed from helically wound metal strands or wires.

The cables are pulled from a payout cable reel and passed through stringing blocks, travelers, sheaves or pulleys on supporting structures of the transmission/distribution network. Due to their helically wound construction, the cables have an inherent tendency to rotate or twist about the long axis of the cable in response to uncoiling forces while being pulled from the payout cable reel during stringing.

The tendency of cable to rotate or twist while being strung causes problems with strain and possible breakage or damage of the electrically conductive and non-conductive components in the cables due to the twisting forces. Twisting problems are particularly compounded when the cable is strung over an angular or irregular course where corners or turns are present.

Prior art devices have been designed with an aim to prevent such twisting. In most cases, the device includes a leader member or tow member connected at one end to the cable to be strung and at the other end to a pulling rope. One or more weighted sections are connected in series to form a tail and they are connected to the tow member by one end of the tail so as to hang down from the tow member. The tails counteract the twisting force or torque of the twisting cable.

In some cases, when twisting forces in the cable overcome the tails' resistance to the twisting, the tails may spin around the tow member about the long axis of the tow member. This is sometimes referred to as whip-lashing. Whip-lashing in addition to failing to prevent twisting of the cable, may be dangerous to the safety of personnel or equipment if the tails come in contact with adjacent wires which may be energized, thereby energizing the cable being strung, payout cable reel and pulling equipment.

In the prior art, the mass of the tail suspended from the tow member has been estimated to counter the force of the twisting rotation or torque in the cable. Generally, the tail is mounted at a point along the tow member such that the length of the tail can be accommodated in storage channels formed in and along the length of the tow member when the tail and tow member are simultaneously pulled through a pulley or sheave of the stringing system.

At least some weighted sections in the prior art are made from electrically conductive materials. In applicant's view, using electrically conductive materials along the entire length of a tail may present a further hazard since electrical charge is not prevented from travelling through the tails to the cable being strung, payout cable reel and pulling equipment so as to potentially injure personnel or damage equipment and property.

In the prior art applicant is aware of U.S. Pat. No. 4,805,878 which teaches a device having a line of weights consisting of a tube filled with weighted slugs or segments, wherein the weight of the weighted tube counteracts the tendency of the cable to twist.

U.S. Pat. No. 3,011,765 teaches a device having one or more articulated pendulums for counteracting the tendency of the cable to twist.

U.S. Pat. No. 2,663,748 teaches a device having one or more weighted arms comprised of a solid bar of material wherein the weight of each arm is calculated to oppose the twisting action of the tow line.

SUMMARY

An anti-rotation device is provided for resisting rotation of a cable as it is strung through a transmission/distribution network and to protect workers and equipment by insulating the cable and pulling line if the anti-rotation device tails accidentally contact an energized powerline. The device includes a tow component connectable to the cable at one end, and a plurality of pendulum-like electrically insulated weighted tails suspended from the tow component. The plurality of the tails may be located in a spaced apart array along the tow component. Each tail includes one or more insulated tail sections and one or more weighted tail sections pivotally mounted end-to-end, and removably coupled, to one another. An uppermost electrically insulated tail section is coupled to a connecting section connecting the tail to the tow component where the insulated tail forms a rotating "T" junction with the tow component.

The anti-rotation device may be produced by the process of:
  a) determining a rotational force moment of the cable as it is strung through the transmission/distribution networks, and in particular through travelers or sheaves used for stringing the cable;
  b) determining a weight and length requirement for each insulated tail in a spaced array of tails spaced along a tow component to collectively produce a counter-moment, to counter the rotational force moment of the cable acting on the insulated tails;
  c) determining the number of insulated tails required to meet the weight and length requirement to collectively resist the rotational force moment acting to twist the cable; wherein the length of each insulated tail is constrained by the length of, and cannot exceed, the length of the spacing between adjacent insulated tails in the array of tails, and, in first and second embodiments, better described below, the widths of each insulated tail is constrained by the width of a tail-storage channel formed along the length of the bottom of the tow component, and, in a third embodiment, the width of the tow component is constrained by the width of a storage channel formed along the length of each insulated tail, wherein the constrained length and width of each insulated tail, and the density of the material of each insulated tail determine its weight and the amount of counter-moment produced by each insulated tail, and
  d) connecting the required number of insulated tails, as determined in step (c), to the tow component, wherein each of the tails include at least one electrically insulated tail section adjacent the junction of the tail with the tow component, and a series of weighted non-electrically insulated tail sections coupled to the at least one electrically insulated tail section.

The anti-rotation device includes, in one embodiment, not intended to be limiting, a tow component having a plurality of tow sections connected end-to-end in the tow component.

The insulated tails in the array of tails are preferably spaced apart along the tow component such that a length of the tow component between each tail is at least equal to the insulated tail lengths, assuming that the insulated tails are all the same length. In some embodiments the insulated tails may be of different lengths.

The electrically insulated weighted tails are adapted to provide a counter-moment, counter to the rotational force moment, wherein the counter-moment of each insulated weighted tail is substantially equal to the rotational force of the cable acting on each insulated weighted tail in the array of insulated weighted tails.

It is to be understood that other aspects of the present disclosure will become readily apparent to those skilled in the art from the following detailed description, wherein various embodiments of the disclosure are shown and described by way of illustration. As will be realized, the disclosure is capable of other and different embodiments and its several details are capable of modification in various other respects, all without departing from the intended scope of the present disclosure. Accordingly, the drawings and detailed description are to be regarded as illustrative in nature and not as restrictive.

BRIEF DESCRIPTION OF THE DRAWINGS

A further, detailed, description of the disclosure, briefly described above, will follow by reference to the following drawings of specific embodiments of the disclosure. The drawings depict only typical embodiments of the disclosure and are therefore not to be considered limiting of its scope. In the drawings:

FIG. 24 is, in perspective view, a front or upstream portion of the anti-rotation device of FIG. 23 showing the upstream-most weighted tail fully upwardly rotated so as to store the tow component nested in the storage channel of the weighted tail;

FIG. 25 is, in side elevation view, the anti-rotation device of FIG. 24;

FIG. 26 is a cross-sectional view along line 26-26 in FIG. 25;

FIG. 31 is, in perspective view, an insulated tail section of the weighted tail of FIG. 27;

FIG. 31A is a side elevation view of the tail section of FIG. 31;

FIG. 31B is an end elevation view of the tail section of FIG. 31;

FIG. 31C is a plan view of the tail section of FIG. 31;

5

Figure 27:
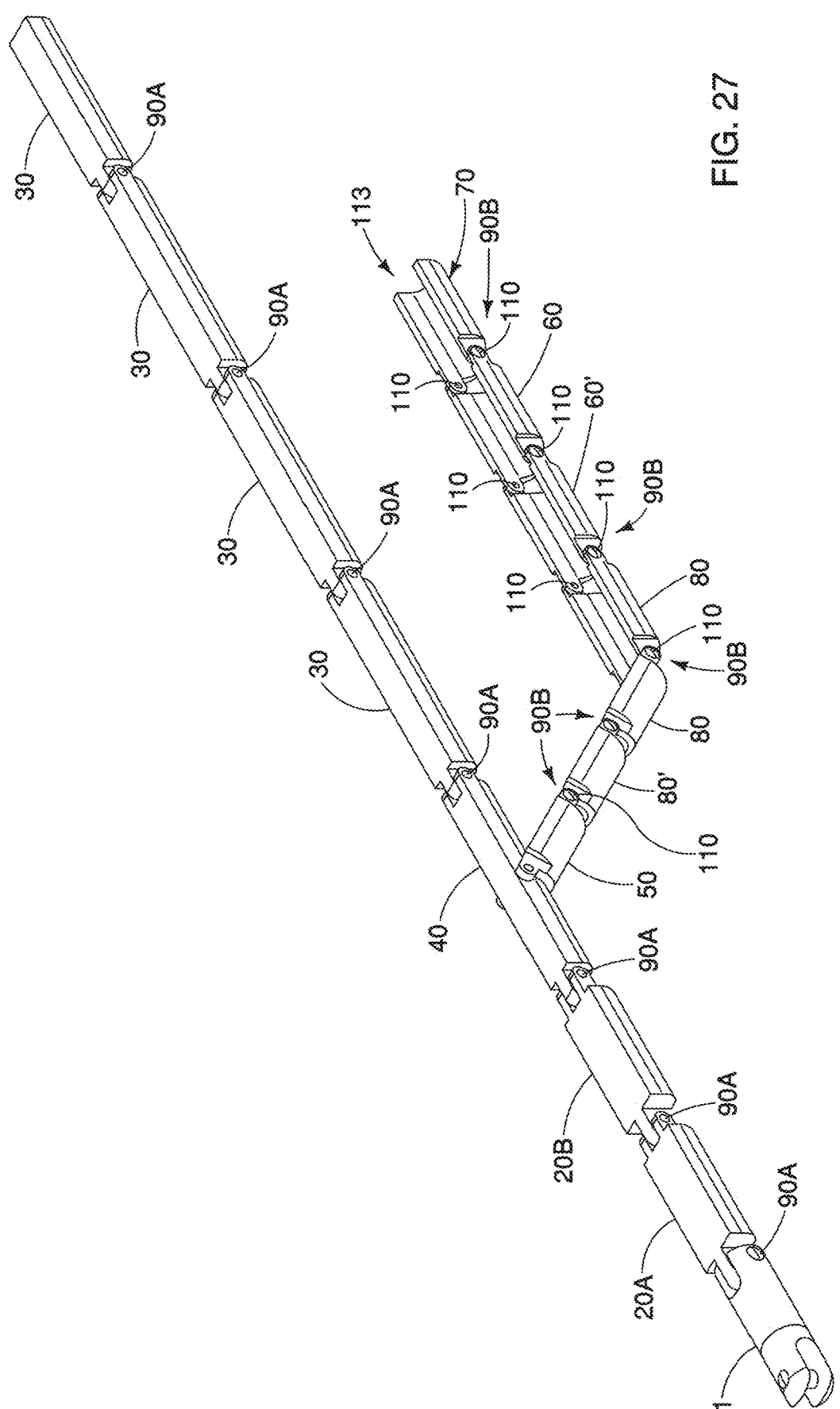
FIG. 27 is, in perspective view, the anti-rotation device of FIG. 24 with the weighted tail partially rotated below the tow component.
Figures 28, 28A, 28B, 28C:
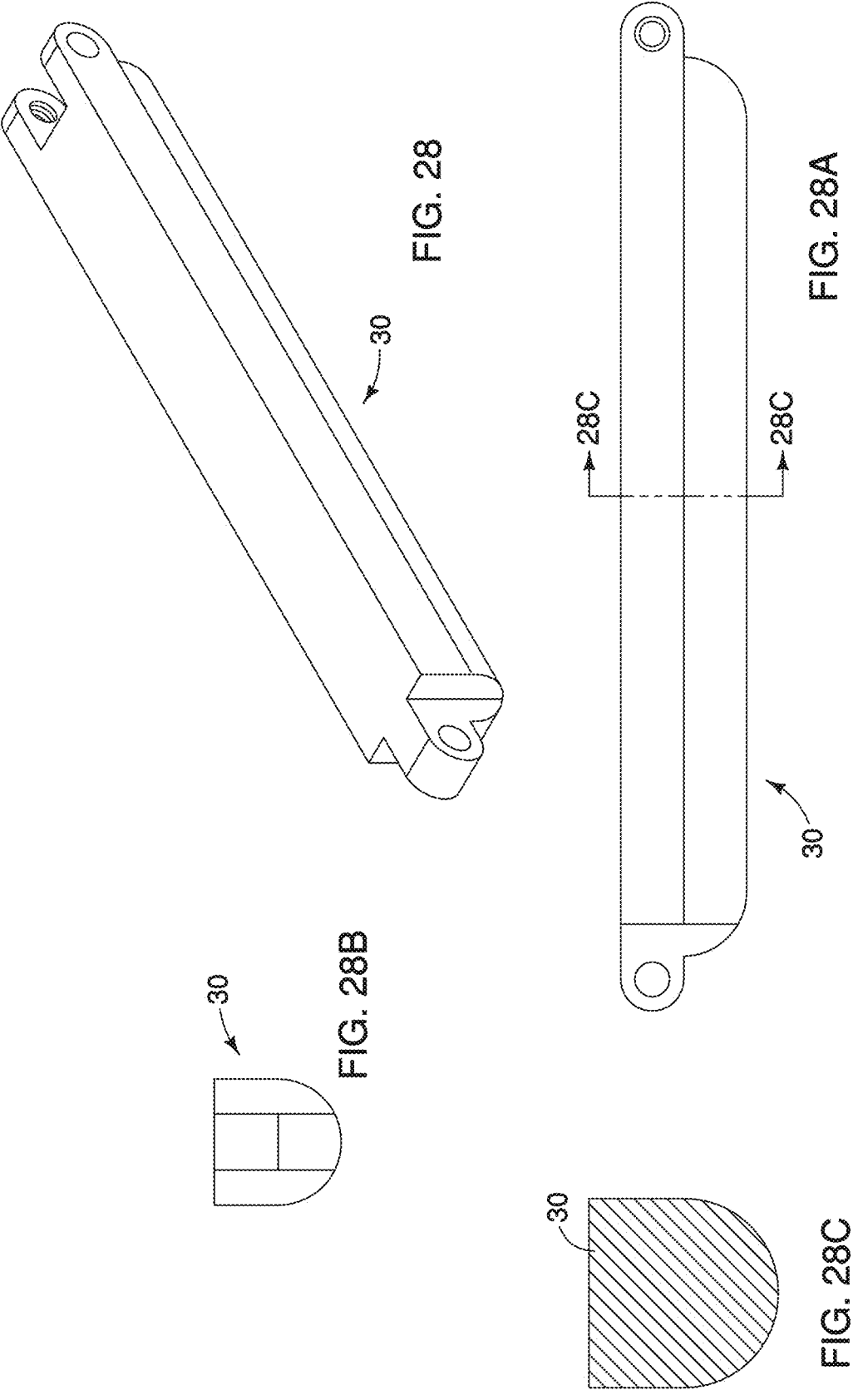
FIG. 28 is, in perspective view, a tow section of the tow component.
FIG. 28A is a side elevation view of the tow section of FIG. 28.
FIG. 28B is an end elevation view of the tow section of FIG. 28.
FIG. 28C is a cross-sectional view along line 28C-28C in FIG. 28A.
Figures 29, 29A, 29B, 29C, 29D:
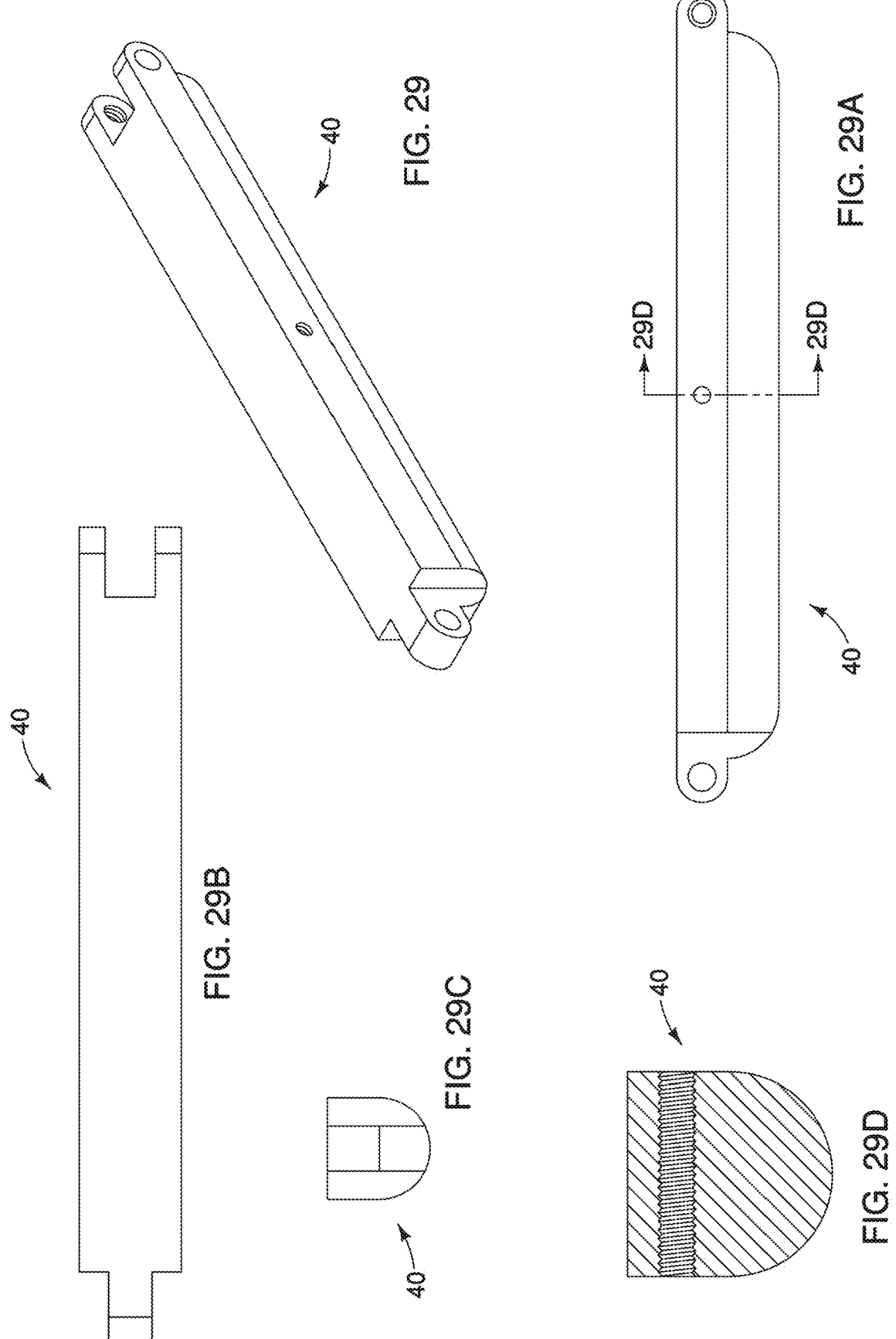
FIG. 29 is, in perspective view, a tail connector link of the tow component.
FIG. 29A is a side elevation view of the link of FIG. 29.
FIG. 29B is a plan view of the link of FIG. 29.
FIG. 29C is an end elevation view of the link of FIG. 29.
FIG. 29D is a cross-sectional view along line 29D-29D in FIG. 29A.
Figure 30:
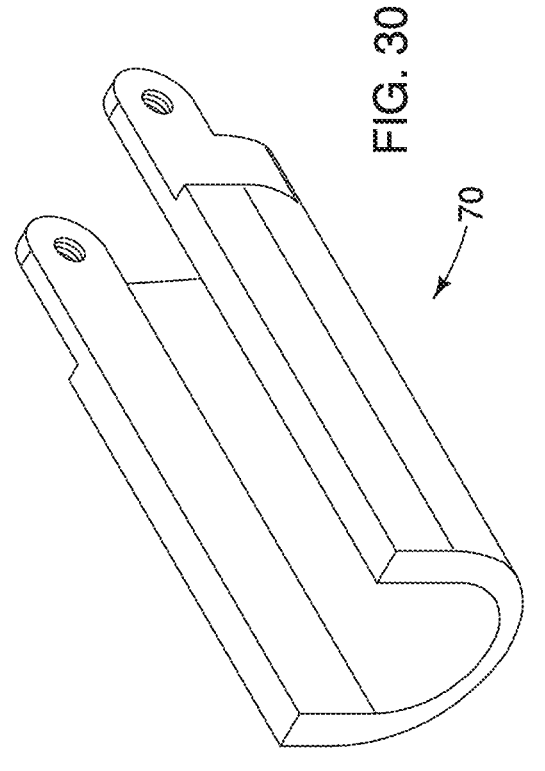
FIG. 30 is, in perspective view, an end weighted tail section of the weighted tail of FIG. 27.
Figure 30A:
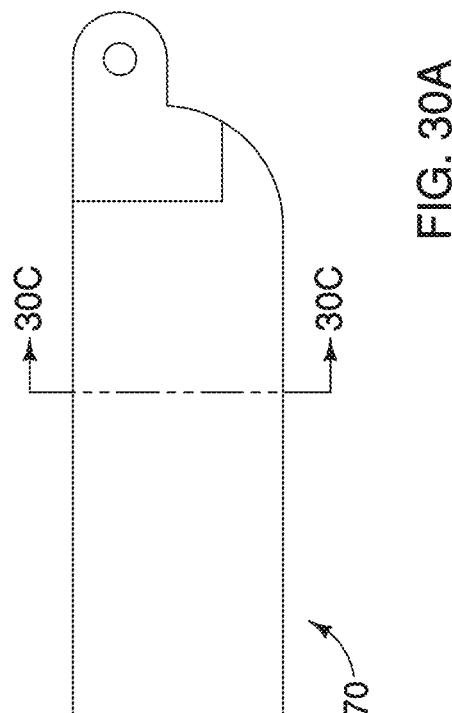
FIG. 30A is a side elevation of the tail section of FIG. 30.
Figure 30B:
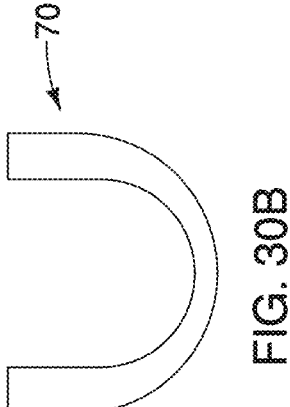
FIG. 30B is an end elevation view of the tail section of FIG. 30.
Figure 30C:
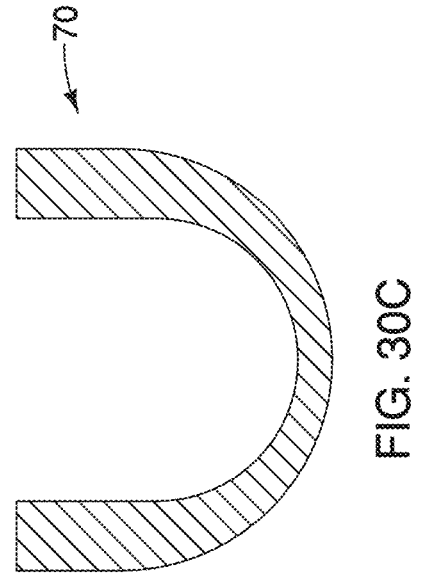
FIG. 30C is a cross-sectional view along line 30C-30C in FIG. 30A.
Figure 33:
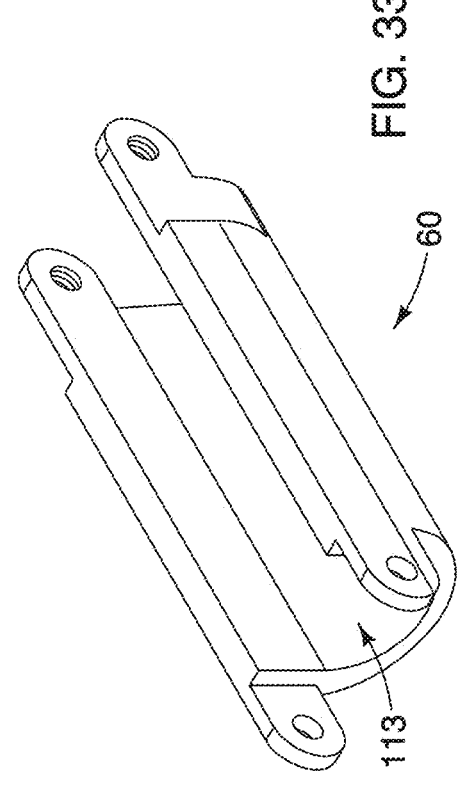
Figure 33A:
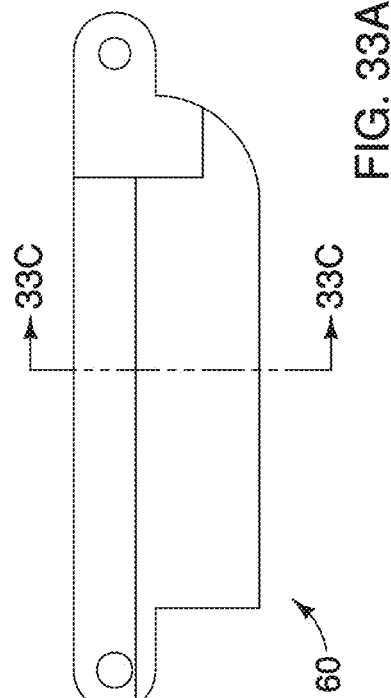
Figure 33B:
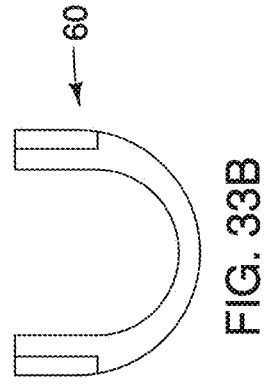
Figure 33C:
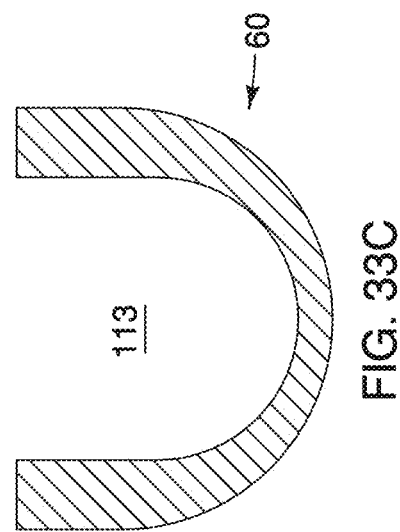
Figures 34, 34A, 34B:
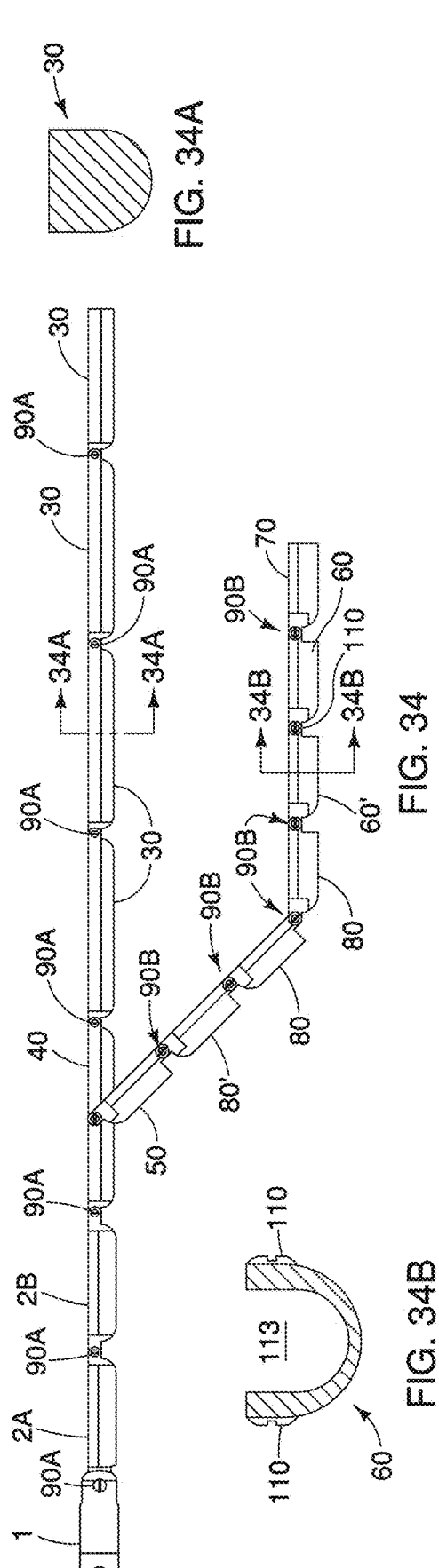

FIG. 32 is, in perspective view, the insulated tail connector section of the tow component of FIG. 27;

FIG. 32A is a side elevation view of the tail connector section of FIG. 32;

FIG. 32B is an end elevation view of the tail connector section of FIG. 32;

FIG. 32C is a plan view of the tail connector section of FIG. 32;

FIG. 33 is, in perspective view, a weighted tail section of the tail of FIG. 27;

FIG. 33A is a side elevation view of the tail section of FIG. 33;

FIG. 33B is an end elevation view of the tail section of FIG. 33;

FIG. 33C is a cross-sectional view along line 33C-33C in FIG. 33A;

FIG. 34 is a side elevation view of the anti-rotation device of FIG. 27;

FIG. 34A is a cross-sectional view along line 34A-34A in FIG. 34; and

FIG. 34B is a cross-sectional view along line 34B-34B in FIG. 34.

The drawings are not necessarily to scale and in some instances, proportions may have been exaggerated in order to more clearly depict certain features.

DETAILED DESCRIPTION

The description that follows and the embodiments described therein are provided by way of illustration of an example, or examples, of particular embodiments of the principles of various aspects of the present disclosure. These examples are provided for the purposes of explanation, and not of limitation, of those principles and of the disclosure in its various aspects.

The present disclosure provides descriptions, not intended to be limiting, of three examples of embodiments of an anti-rotation device 100. The anti-rotation device 100 uses weights which are pivotally connected end-to-end to form a weighted tail 600 for bending in a first plane, plane A, where the weighted tail 600 provides a resistive moment to the cable, in a second plane substantially orthogonal to the first plane. The resistive moment is substantially equal to, or more than, the twisting, rotational forces or torque of the cable being strung.

Figure 1:
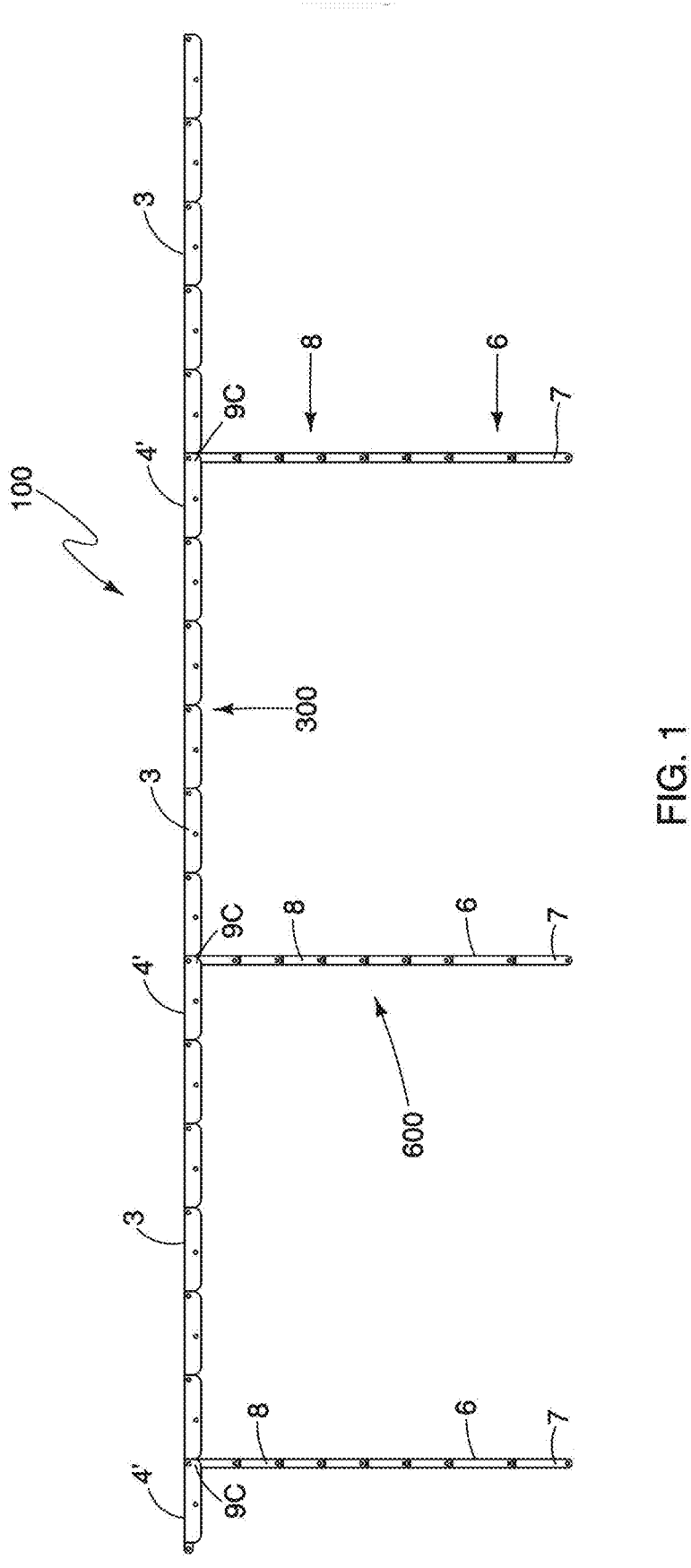
FIG. 1 is side elevation view of a first embodiment of the present anti-rotation device.

With reference to the Figures, wherein like reference numerals depict corresponding parts in each view, as seen in FIG. 1, anti-rotation device 100 includes a tow component 300 and one or more insulated weighted tails 600 hanging from the tow component 300.

Figure 8:
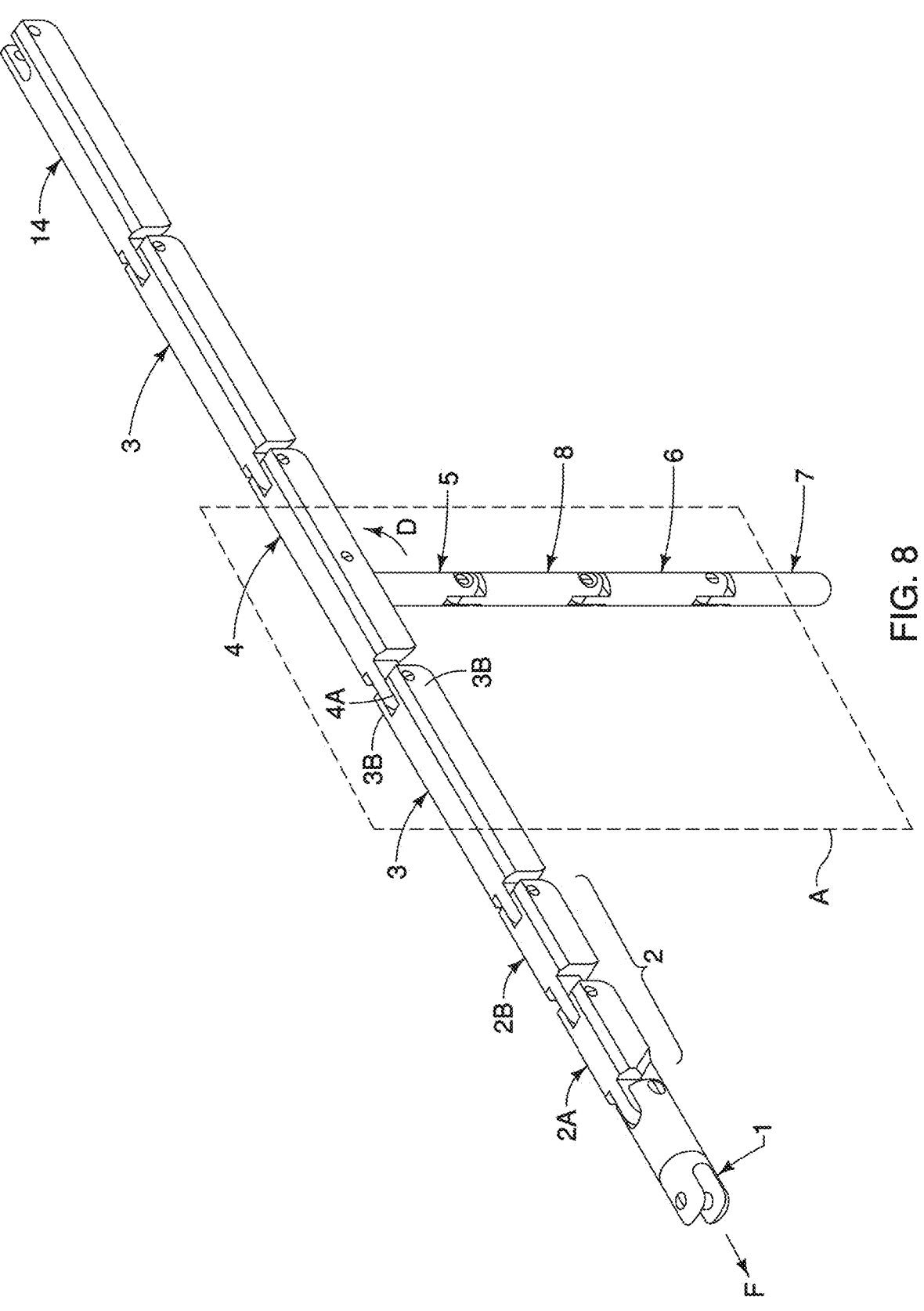
FIG. 8 is a perspective view of the second embodiment showing a portion of the tow component and an insulated weighted tail, with sections of the tail removed for clarity of the view, suspended therefrom.

The tow component 300 is preferably comprised of a plurality of tow sections 3 that are pivotally connected end-to-end to one another to provide articulation which is restricted to the plane of bending, plane of bending A, seen illustrated diagrammatically in FIG. 8, of the tow component 300. End section 14 may be employed to connect tow component 300 to a cable or wire. Tow component 300 bends when, for example, it is pulled over a traveler or sheave such as seen in FIG. 4 where tow component 300 is shown being pulled over a traveler or sheave 400. The plane of bending A of the tow component 300 is shown in dotted outline in FIG. 8 and coincides with a plane containing the tow component 300, the insulated weighted tails 600 and the traveler or sheave 400, such as seen in FIGS. 3 and 4, when the tow component 300 and insulated weighted tails 600 are being simultaneously pulled through and over the traveler or sheave 400. A direction of pull F is shown by way of illustration in FIG. 8.

The tow sections 3 are preferably releasably connected to one another to allow adjustment of the length of the tow component 300 by removing or adding tow sections 3. The releasable connection between tow sections may advantageously be single degree of freedom hinges, such as pinned hinges 9, so as to constrain the bending articulation of the tow sections relative to one another to solely within the plane of bending A.

Figures 2, 3:
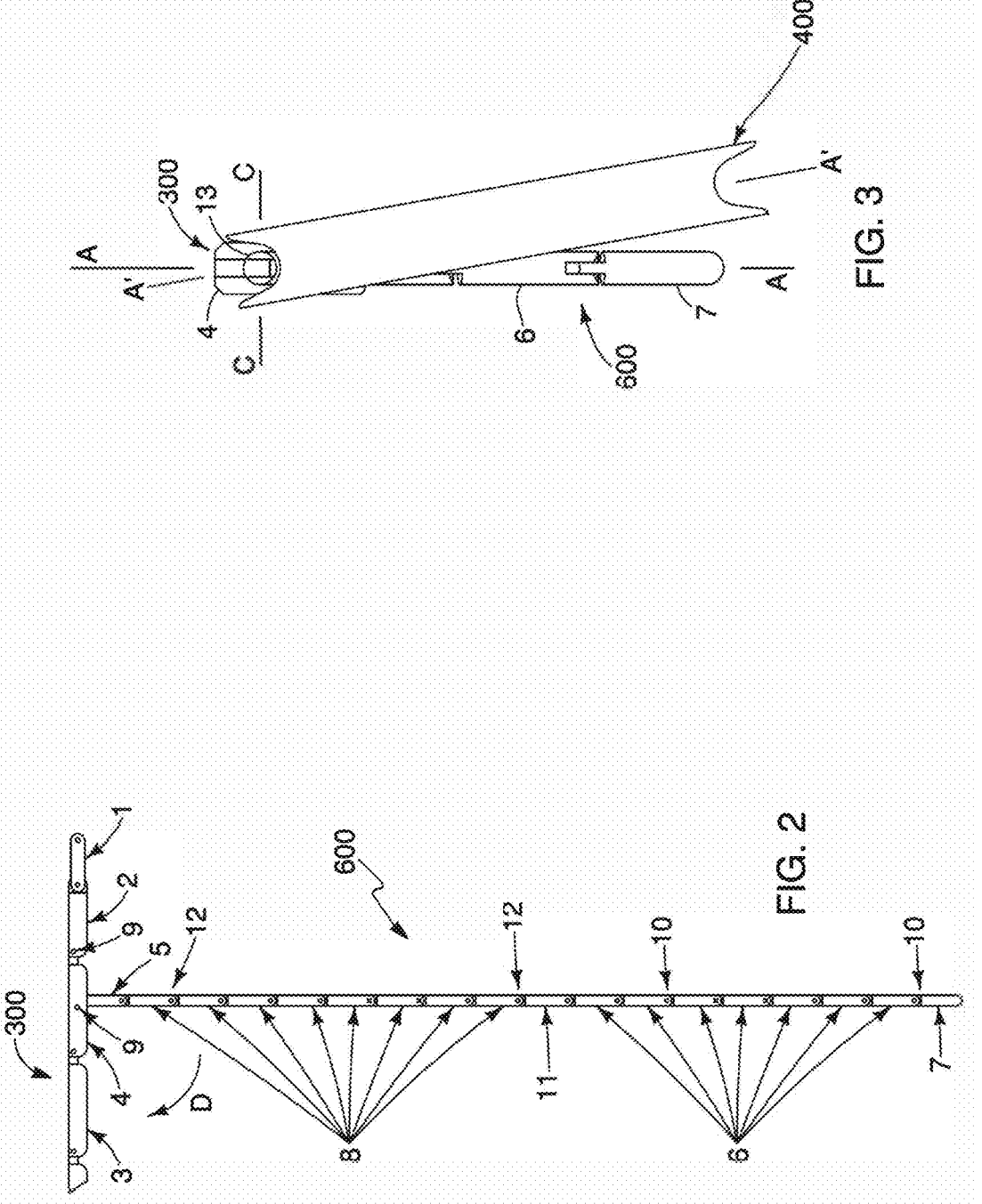
FIG. 2 is a side elevation view of a second embodiment of an insulated weighted tail connected to the tow component.
FIG. 3 is a front elevation view of an insulated weighted tail and leading end of a tow section according to the embodiment of FIG. 2 passing over a sheave used for stringing the cable.
Figure 4:
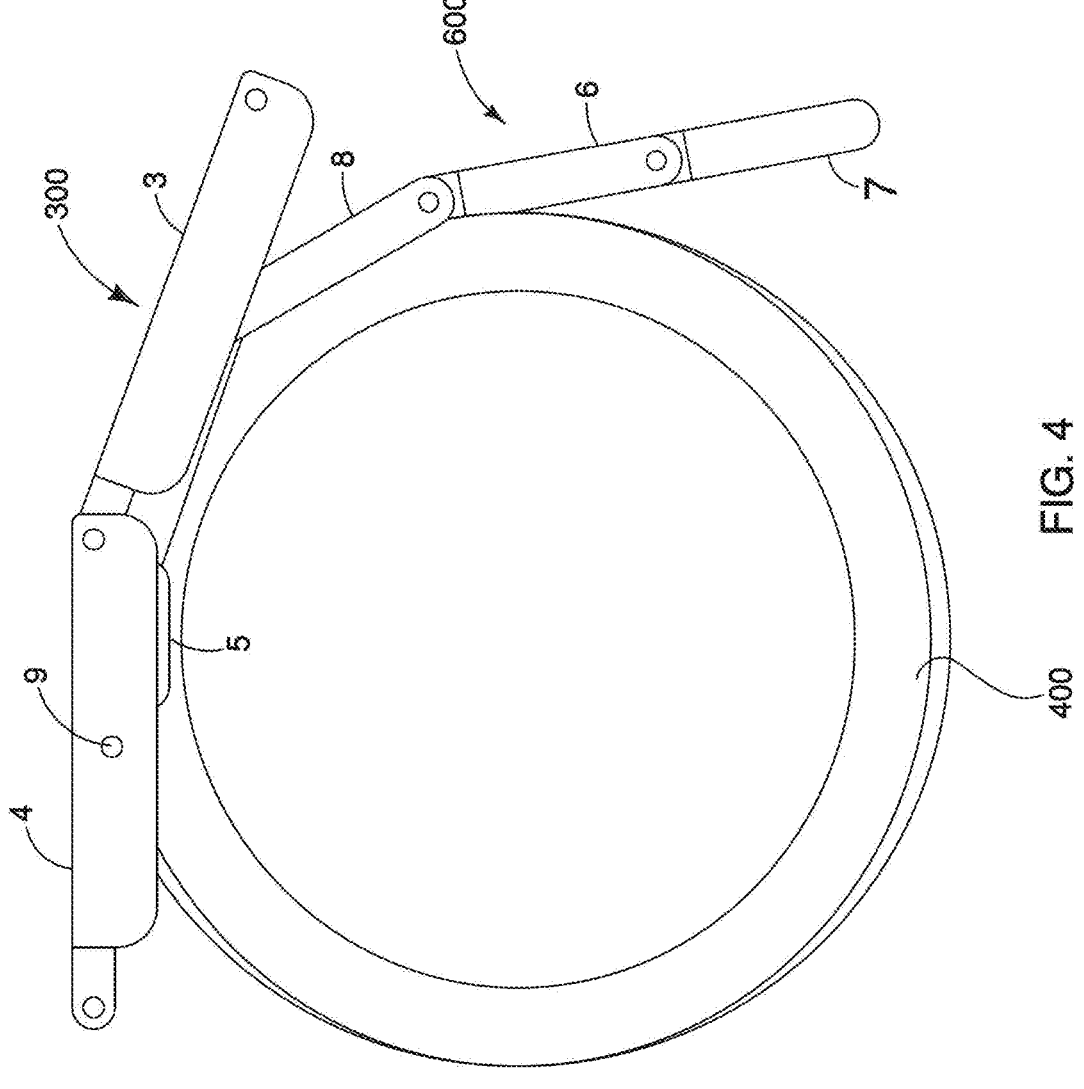
FIG. 4 is a partially cut away side elevation view of FIG. 3.
Figure 9:
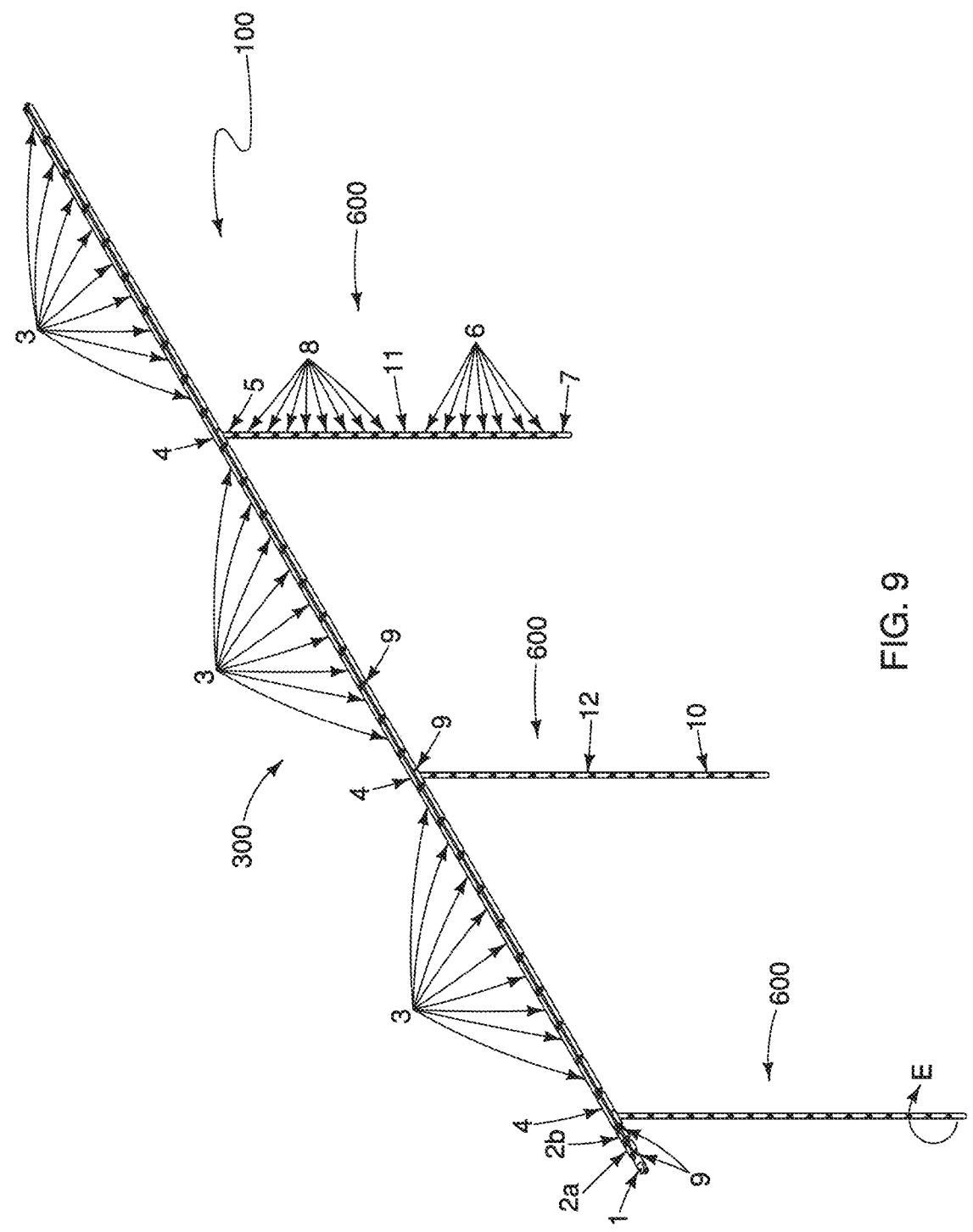
FIG. 9 is a perspective view encompassing the side elevation view of FIG. 2.
Figure 10:
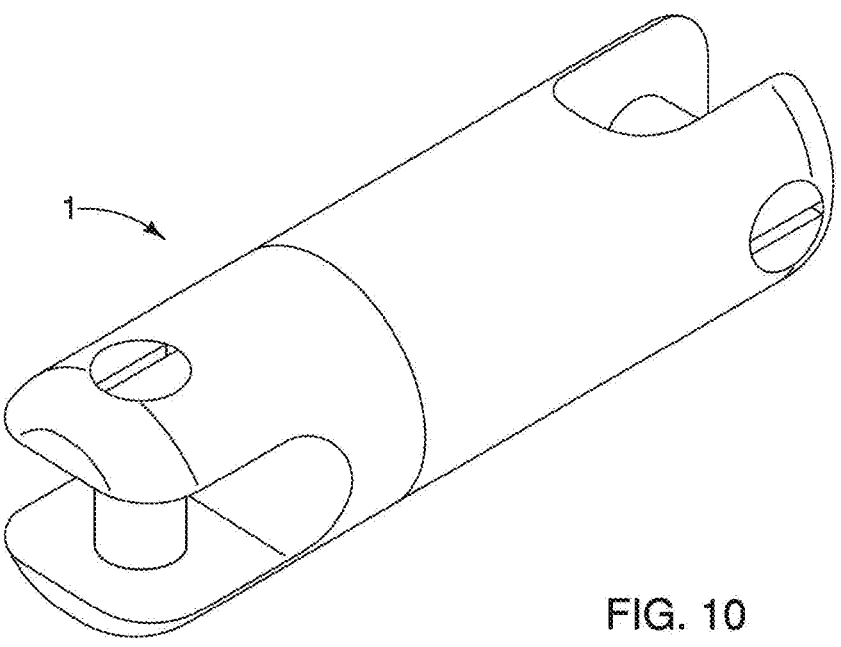
FIG. 10 is a perspective view of a conventional swivel for connecting the anti-rotation device to a pulling line.

The tow component 300 may also advantageously comprise a conventional swivel connection 1, as seen in FIGS. 2 and 9 and better seen in FIG. 10. A first end of swivel connection 1 is connected to the pulling line (not shown) to allow the pulling line to rotate and twist as it pulls the cable through the transmission/distribution network without affecting the operation of anti-rotation device 100.

The tow component 300 may also advantageously comprise one or more tail connector links interspersed between tow sections 3 along tow component 300. Two forms of tail connector links, links 4 and 4', are shown illustrated by way of example. Links 4 are illustrated throughout the Figures; for example, in the longitudinal cross-sectional view of FIG. 7. Links 4' are illustrated in FIG. 1 so as to emphasize that various forms of tail connector links could be made to work, and that the anti-rotation device 100 is not intended to be limited to the design of tail connector link 4.

In the first embodiment of the anti-rotation device, and as seen in FIG. 1, tail connector link 4' may be pivotally connected to electrically insulated weighted tail 600 by means of a hinged joint 9C at the leading end of tail connector link 4'. A dog leg offset tail connector section 5, also referred to herein as a dog leg section 5 and better seen in FIG. 7, may be employed to provide the advantageous offset described below which, in the first embodiment, assists in the folding of the insulated weighted tail 600 up flush into a storage channel in the bottom of tow component 300. However, the embodiment in FIG. 1 illustrates that the use of a dog leg section 5 is also not required, as other forms of connecting the insulated weighted tails 600 to the tow component 300 will also work. In FIG. 1 insulated weighted tail 600 is mounted to tow component 300 at joint 9C. Joint 9C is formed in the side walls, at the leading end of the tail storage channel in tail connecting link 4'. This design is in applicant's view not as preferable as the design of tail connector links 4, such as seen in FIGS. 2 and 6, for the reasons set out below.

Figures 5, 6:
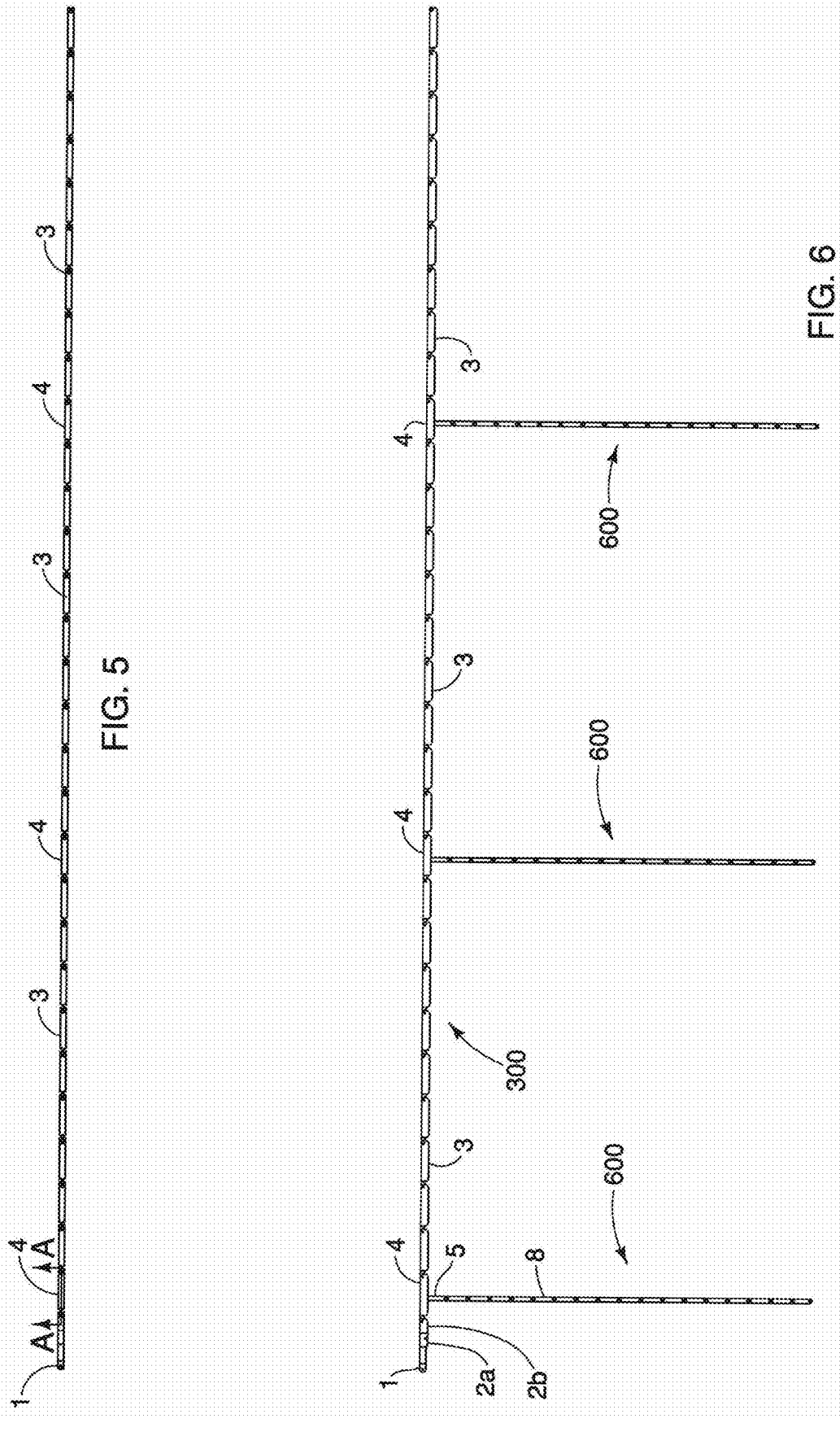
FIG. 5 is a plan view of the second embodiment of the present anti-rotation device.
FIG. 6 is a side elevation view of FIG. 5.

In the second embodiment of the anti-rotation device, and as seen in FIGS. 2 and 6, tail connector links 4 are connected to, and interspaced between, tow sections 3 along the length of the tow component 300. Like tail connector links 4', tail connector links 4 serve to support the insulated weighted tails 600 which are suspended in a pendulum like manner from the tow component 300. Tail connector links 4 connect the front links 2 to tow sections 3 and may connect the dog leg section 5 to a tow section 3. The front or leading (relative to pull direction F as seen in FIG. 8) flange 4A on tail connector link 4 lies in plane A and forms part of a pinned hinge or joint between link 4 and tow section 3 which allows tow sections 3 and links 4 to rotate relative to each other up to 90° when pulled over stringing traveler or sheave 400 such as seen in FIG. 4. The smaller the traveler diameter the bigger angle of rotation that is required.

Figure 12:
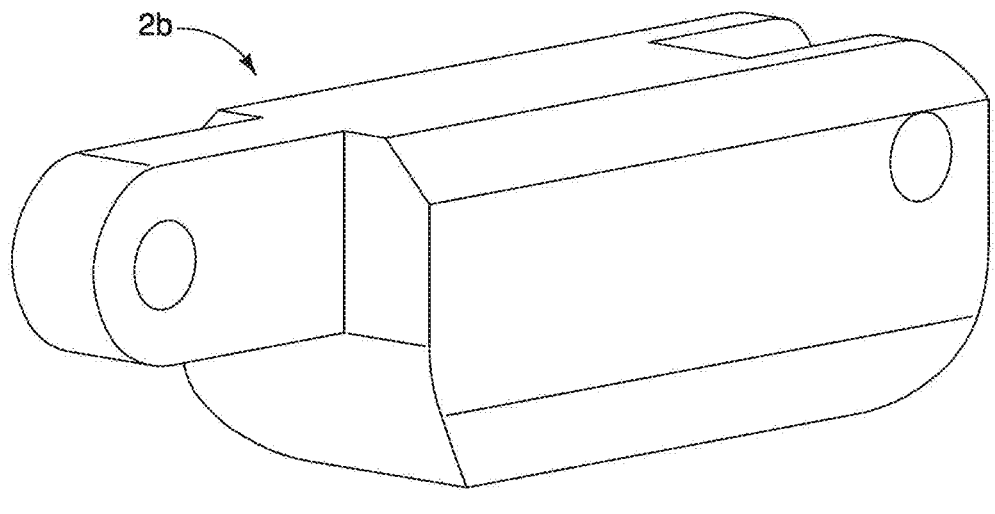
FIG. 12 is a perspective view of the back half section of the front main section which couples behind the front half section of FIG. 11.
Figure 13:
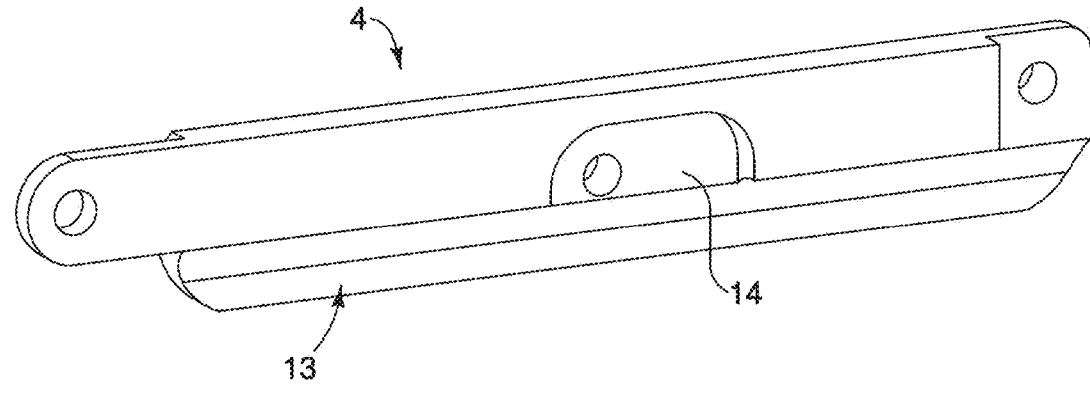
FIG. 13 is the cross section of FIG. 7 showing the cutout for the dog leg offset arm of the tail connector of FIG. 14.
Figure 14:
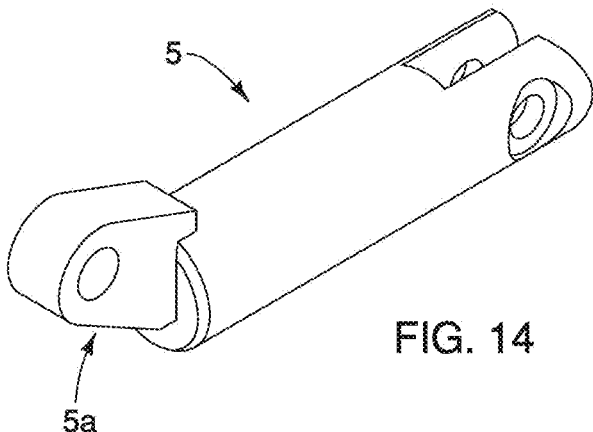
FIG. 14 is a perspective view of the dog leg offset arm of the tail connector of FIG. 7.
Figures 15A, 15B, 16:
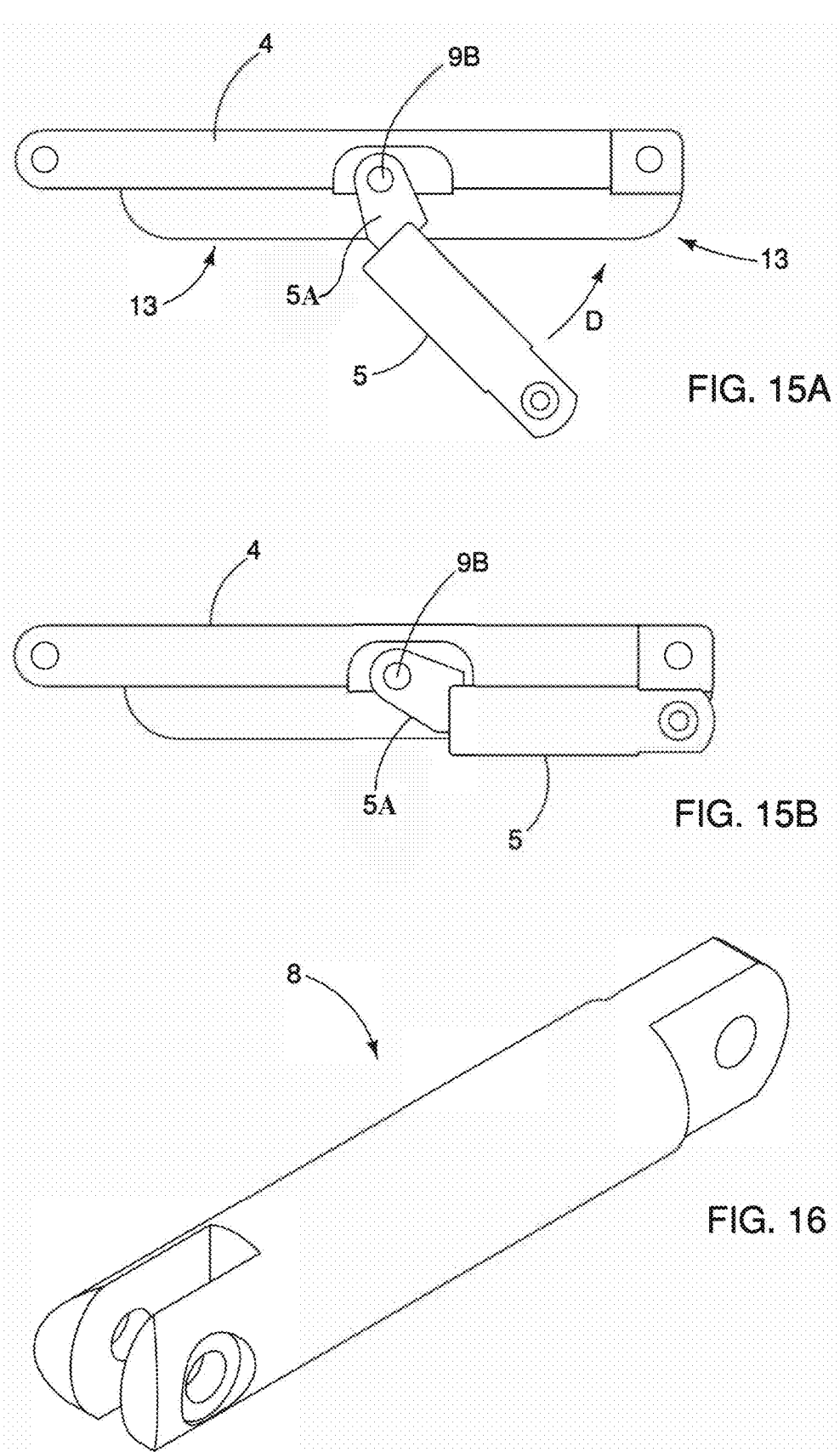
FIG. 15A shows the tail connector of FIG. 7 pivoting from the free hanging position in FIG. 7 towards its storage position.
FIG. 15B shows the tail connector of FIG. 15A pivoted into its storage channel flush underneath the tail connecting link.
FIG. 16 is a perspective view of an electrically insulating tail section of the weighted tail of FIG. 8.
Figure 17:
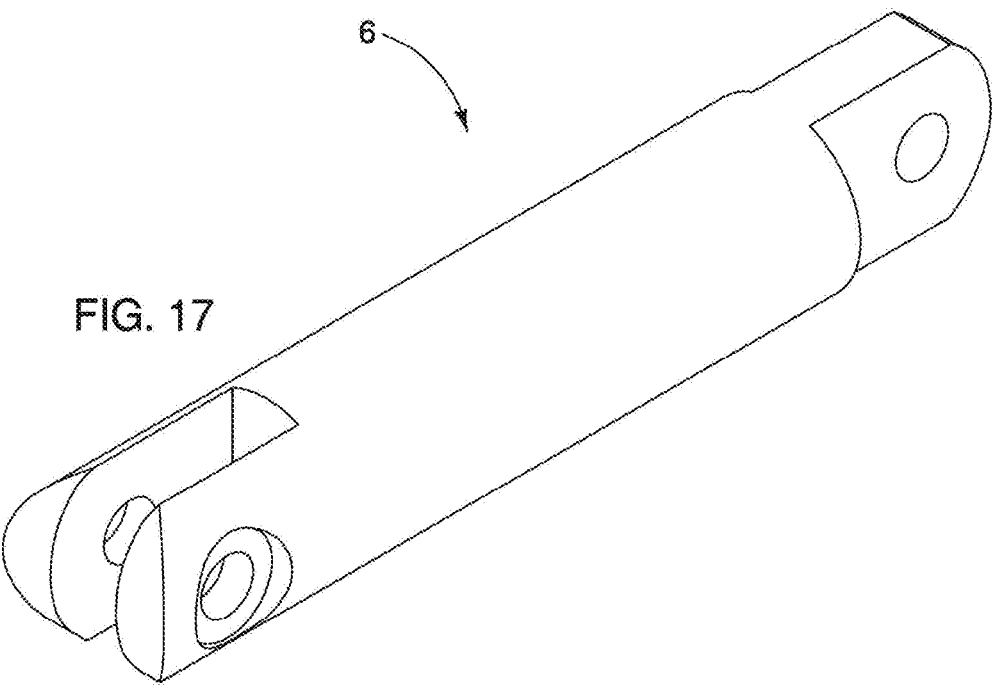
FIG. 17 is a perspective view of a weighted tail section of the weighted tail of FIG. 8.
Figure 18:
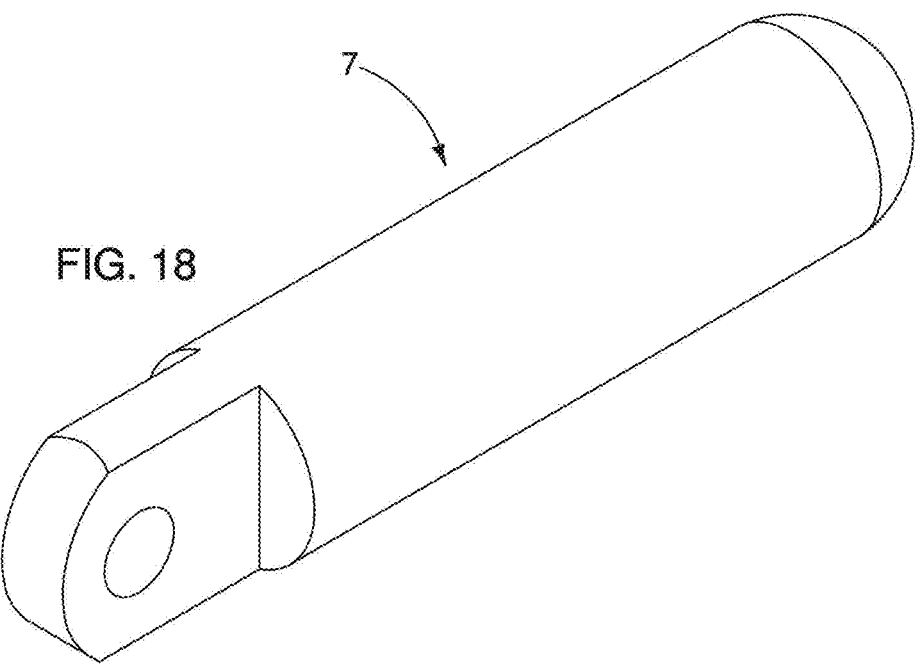
FIG. 18 is a perspective view of a weighted end section of the weighted tail of FIG. 8.

In the first and second embodiments, seen in FIGS. 1-18, storage channel 13, seen for example in the sectional view of FIG. 13, is formed along the underside of tail connector 4 and tow sections 3 to accommodate the insulated weighted tails 600 swinging up into flush temporary storage in channel 13 when the tow component 300 is running over a stringing traveler or sheave 400. The third embodiment, discussed below in respect of FIGS. 19-34, is reversed in the sense that the storage channel is in the insulated weighted tail, and the corresponding tow sections snugly fit into the storage channel in the insulated weighted tail as the insulated weighted tail rotates to be flush with the tow section. Each insulated weighted tail includes such a storage channel.

Figure 7:
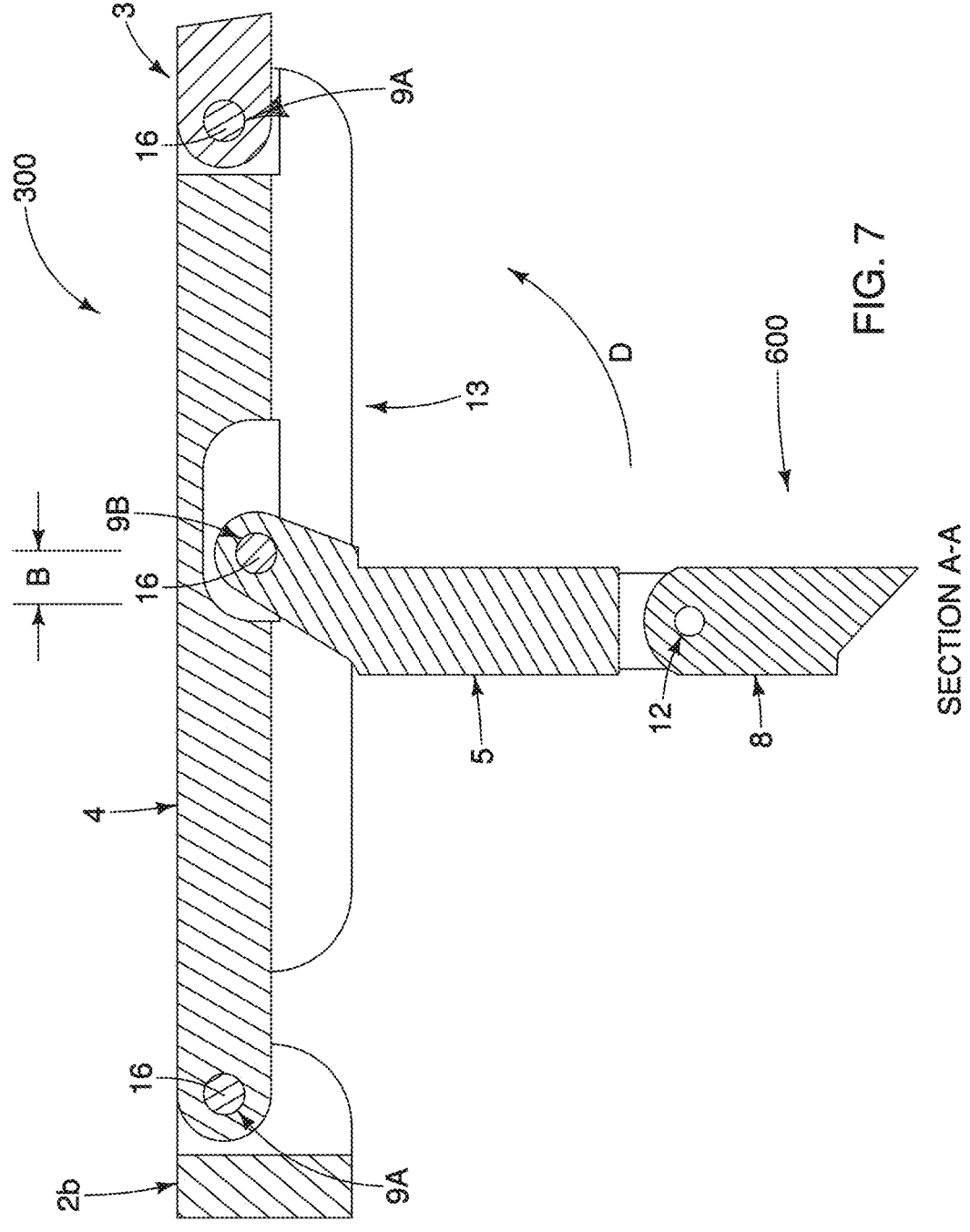
FIG. 7 is a cross-sectional view taken along line A-A of FIG. 5 showing connection of an insulated weighted tail to a tow section.
Figure 11:
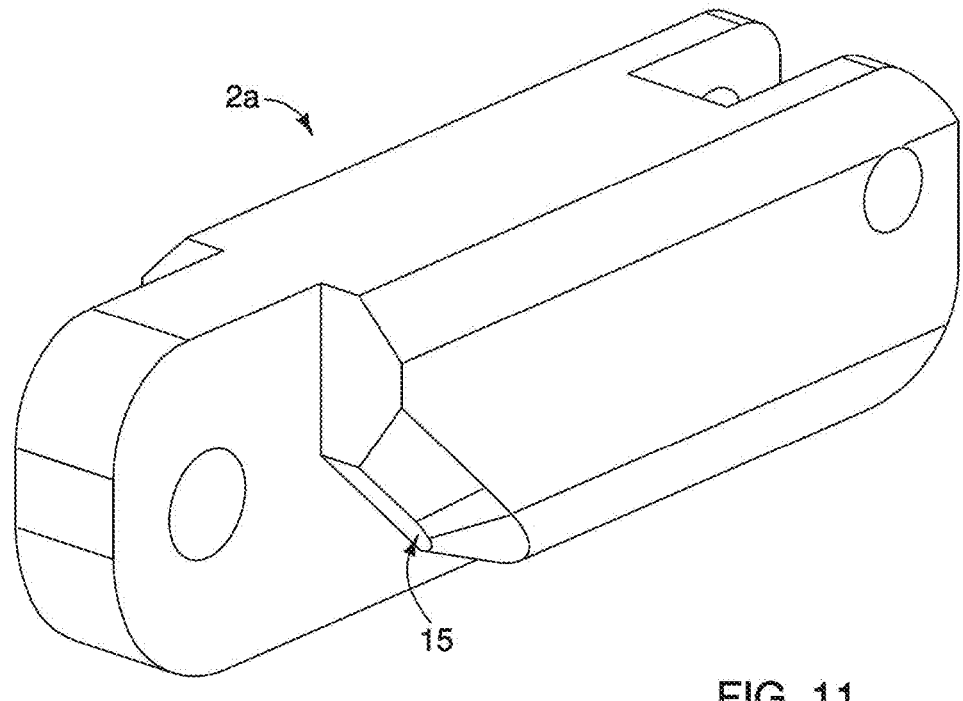
FIG. 11 is a perspective view of the front half section of the front main section which couples behind the swivel of FIG. 10.

One tail connector link 4 is shown for example in the sectional views of FIGS. 7 and 13. Hinged connections or joints 9A join tail connector links 4 to adjacent tow sections 3 or join tail connector links 4 to front main tow sections 2, made up of front and back main tow sections 2A and 2B respectively as seen in FIGS. 11 and 12. In the pinned hinges of FIG. 8, not intended to be limiting, leading flange 4A is sandwiched between a pair of trailing flanges such as trailing flanges 3B on tow sections 3. Flange 4A rotates relative to flanges 3B on hinge pins such as pins 16 seen in FIG. 7. Front tow section 2A is a short link with angled leading edges 15 angled at 45° as seen in FIG. 11 to assist in aligning the anti-rotation device 100 with stringing traveler or sheave 400 on an angle such as seen in FIG. 3, which allows the anti-rotation device 100 to run smoothly through the traveler or sheave 400 without binding. The back or rear tow section 2B is a short link that connects front tow section 2A to tow section 3 or tail connector link 4. The separate sections 2A and 2B are coupled by a hinge to provide additional flexibility for the tow component when entering into a traveler or sheave 400. The two front links 2A and 2B taken together are the same length as each of the tow sections 3.

The tail connector link 4 includes a hinged connection or joint 9B for connecting the insulated weighted tail 600 to tow component 300, wherein joints 9A and 9B allow up to 90 degrees of rotation. The connection of tow component 300 to insulated weighted tail 600 is a rotating T-junction, rotating in plane of bending A, to allow rotation in, and to constrain rotation to, plane of bending A of insulated weighted tail 600 relative to tow component 300 when free to hang downwardly from the tow component 300.

The insulated weighted tail 600 is preferably made up of one or more different tail sections 5, 8, 11, 6 and 7, in the order as illustrated progressing downwardly in FIG. 2 and as illustrated progressing downwardly along the insulated weighted tail to the right in FIG. 9. The tail sections are connected end-to-end to one another in series using hinged connections or joints such as pinned hinges 10 and 12, to provide articulation to the insulated weighted tail 600 in, and restricted to, the plane of bending A. Articulation allows the insulated weighted tail 600 to swing in the plane of bending A so as to swing away from or towards, while remaining in alignment with, the tow component 300 such as while the anti-rotation device 100 is pulled over traveler or sheave 400, as illustrated in FIGS. 3 and 4.

As noted, insulated weighted tail 600 may advantageously be comprised of different types of tail sections. For example, as seen in FIGS. 2, 4, 7, 8, 15A and 15B, a dog-leg offset tail connector section 5 may advantageously be used to pivotally connect the insulated weighted tail 600 to the tow component 300 for rotation in the plane of bending A about the tail connector link 4. The offset arm 5A of tail connector section 5 provides an offset B as seen in FIG. 7. Offset B between the long axis of tail connector section 5 and hinged connection 9B allows the hinged connection 9B to rotate up to 90° in direction D and to be mounted to a more solid main body of the tail connector link 4 rather than merely passing a hinge pin through the thinner walls of the storage channel 13 formed in the underside of link 4, while still permitting rotation of the tail 600 into its stored position within the storage channel 13 formed in the tow component 300. With the hinge pin 16 of hinged connection 9B journaled through a thicker part of link 4, the hinge pin 16 is less likely to be torn out of tail connection link 4 from the weight of the insulated weighted tail 600 for example combined with the stress on the hinge pin 16 due to pulling of anti-rotation device 100 through a traveler or sheave, or due to whipping, discussed below, of the corresponding tail component 600.

Each insulated weighted tail 600 includes one or more electrically insulated tail sections 8, releasably connected end-to-end to one another. For example, an insulated tail section 8 may be advantageously pivotally connected directly to, so as to depend from, the dog-leg tail connector 5 as the first or substantially the first of the tail sections in insulated weighted tail 600 as seen progressively extending downwardly from tow component 300. In alternative embodiments, one or more electrically conductive tail sections may be interspersed between the link 4 or connector 5 and the first insulated tail section 8, or between insulated tail sections 8, so long as at least one weighted tail section at or towards the bottom of the tail depends from an insulated tail section. In other words, the present invention is not limited to the exact order of electrically insulated tail sections followed by weighted tails sections such as illustrated, as other combinations of the order of insulated tail sections vis-à-vis the weighted tail sections are intended to be within the scope of the present disclosure so long as the required counter torque results.

Electrically insulated tail sections 8 may preferably be made of insulated plastic, or fiberglass, or other rigid polymer, ceramic, etc. dielectric compositions so long as tail sections 8 provide electrical insulation between tow component 300 and the electrically conductive weighted tail sections 6 and 7 in insulated weighted tail 600, and so long as they provide sufficient strength in tension and shear. Advantageously the electrically conductive weighted tail sections 6 and 7 depending downwardly from the insulated tail sections 8 are made from dense or heavy material such as a dense metal to efficiently provide the resistive moment resisting the twisting of the cable. Insulated tail sections 8 serve to electrically isolate the lower weighted tail sections 6, and 7, from the tow component 300, and may not be of high density as they are not intended to significantly contribute to the counter rotation moment provided by the anti-rotation device 100 as they are mounted too close to the tow component 300 to have a significant moment arm.

The electrically insulated tail section 8, or insulated tail sections 8, if more than one, are advantageously mounted nearest to tail connector link 4. Again, because electrically insulated tail sections 8 are coupled closely adjacent to link 4, the counter-rotational moment they contribute is relatively small due to their shortened moment arm, no matter what they weigh. Thus, they may be of less dense electrically insulating material without significantly affecting the overall counter-moment provided by insulated weighted tail 600. Indeed, if insulated tail sections 8 are made of electrically insulating materials, e.g. plastics, fibreglass, ceramic, etc., and are less dense (weigh less) than weighted tail sections 6 and 7 which are for example made of heavier steel, copper, etc., then mounting insulating tail sections 8 close to tow component 300 allows the heavier weighted tail sections 6 and 7 to be mounted where they have a longer moment arm, thereby collectively increasing the counter rotational moment per tail section. Insulated tail sections 8 provide electrical isolation of the tow component 300 from adjacent conductors in the event that insulated weighted tail 600 flails or whips, for example, upon entering or leaving a sheave, about the longitudinal axis of the tow component 300 so as to swing weighted tail sections 6 and 7 out of the plane A' of sheave 400 as seen in FIG. 3, and over into contact with an adjacent energized conductor or cable. Such an electrically conductive contact with an adjacent energized conductors or cables may have adverse effects on safety. The use of insulated tail sections 8 is intended to assist in avoiding such adverse effects.

A transition section 11 pivotally connects the last or lower-most insulated tail section 8 and a first or upper-most weighted tail section 6 for relative rotation between sections 8, 11, and 6 in the plane of bending A. An end section 7 may also be pivotally connected to the lower-most tail section 6, again so as to articulate in the plane of bending A relative to tail sections 6.

Hinge connections 9, 10 and 12 may be made with pins, screws, bolts or other suitable rotatable, releasable connectors as may be used to connect the various tow component sections together, the various tail sections together, and the tail component to the tow component to constrain articulation of the tow and tail sections solely to the plane of bending A. Thus advantageously the pivotal connections between sections provide relative movement between adjacent tow sections 2, 3, and 4 and adjacent tail sections 5, 6, 7, and 8 restricted to bending in the plane of bending by the use of hinged connections 9, 10 and 12. As most clearly seen in FIGS. 2, 7 and 9, the hinge connections 10 and 12 allow the respective tow or tail sections to rotate only about an axis of rotation C that is perpendicular to the plane of bending A; wherein the plane of bending A may be defined by the plane containing the length of insulated weighted tail 600 and the length of tow member 300 when the insulated weighted tail 600 is hanging freely vertically downwardly under a suspended tow member 300 when not in motion. Thus, as better seen in FIGS. 7 and 15A, tail component 600 is free to rotate in direction D relative to tow component 300 about hinge 9B to as to stow tail component 600 into its storage channel 13 in and along the underside of tow component 300.

The hinge connections 9, 10 and 12 resist lateral bending of the insulated weighted tails 600, out of the plane of bending A and thus effectively convey the resistive moment of each insulated weighted tail 600 against rotation of the tow member 300 due to twisting of the cable or wire being pulled. The lateral orientation of the hinge pins, so as to be parallel to axis C, in hinge connections 10 and 12 also inhibits misalignment of the insulated weighted tail 600 between the traveler or sheave and the storage channel 13 formed in and along the bottom or the undersides of tow sections 3 and 4 as both the tow component 300 and the tail component 600 are pulled through the traveler or sheave 400. The tail 600 nests within storage channels 13 in tow sections 3 and 4 during travel of the tail 600 around the sheave 400. Misalignment of insulated weighted tail 600 relative to the storage channel 13 during entry of the tail and corresponding tow components into the traveler or sheave may cause the tail to be pinched between the tow component 300 and the traveler or sheave 400 as seen illustrated by way of example in FIG. 3 wherein the misalignment leading to pinching is indicated by the tail component 600 (lying in the plane of bending A) not being aligned with the plane A' containing the traveler or sheave.

In a further preferred embodiment, the present anti-rotation device 100 can be arranged wherein the spacing along tow member 300 between insulated weighted tails 600 is greater, by a predetermined length, than a length of each insulated weighted tail 600. This allows for, during stringing of the cable or wire, more tail sections 6, 7, and 8 to be added to each insulated weighted tail 600. Tail sections 6, 7, and 8 can be added for a number of reasons. Insulating tail sections 8 can be added to increase electrical insulation value between the weighted tail sections 6, and 7 and the tow component 300, for example for re-use of the anti-rotation device 100 in an energized environment at higher voltages. Weighted tail sections 6 can be added to provide further anti-rotational weight to the anti-rotational device 100 in situations where additional weight i.e., more torque resistance, is required, subject to the potential drawbacks of longer insulated weighted sections as discussed below. Such situations can include environmental conditions such as wind, or conditions in the cable such as excessive twisting of the cable when it was spooled on its storage spool or reel and pulling the cable around many corners or turns.

In the embodiment illustrated in FIGS. 2, 5, 6 and 9, the adjacent tails 600 are separated by nine tow sections 3, and each tail includes eight electrically insulated tail sections 8 coupled under the tail connector section 5, and eight weighted tail sections 6 (including transition tail section 11) coupled under the insulated tail sections 8. Weighted end section 7 is lowermost, under the weighted tail sections.

Applicant has found during testing that in some instances, depending on the force of the cable twist and the speed with which the anti-rotation device is pulled through the travelers or sheaves, the number of weighted tail sections could be reduced in number, for example, surprisingly, to only two weighted tail sections 6 without a significant noticeable reduction in the resistance to twisting rotation from the cable being pulled. One benefit of reducing the number of weighted tail sections 6 was that in some cases the lowermost weighted tail sections, and the weighted end section 7, whipped back up and over the lower end of the tail 600, as shown by arrow E on the left most tail in FIG. 9. The force of the whipping motion was sufficient apparently to slightly distort the hinges, including the flanges on the weighted tail sections forming the hinges, so as to allow the whipping of the lowermost weighted tail sections to deflect the lowermost weighted tail sections out of the plane of bending A. The result was a half pretzel-like knot in the lowermost end of the tail. Removing some or most of the weighted tail sections in each tail appeared to resolve the whipping issue causing the knotting. The reduction in the length of the tail components then allowed the tow components to be shortened, for example from nine main tow sections 3 to six tow sections 3 between adjacent tails. In this embodiment then, for each tail, the electrically insulated tail sections may be described as having a cumulative insulated length and the weighted tail sections as having a cumulative weighted length, wherein in this embodiment the ratio of cumulative insulated length to cumulative weighted length may be 4:1. In the embodiment of FIG. 9, the ratio was 1:1, which appeared to allow for the whipping observed of the lower end of the weighted tail sections.

Figures 19, 20:
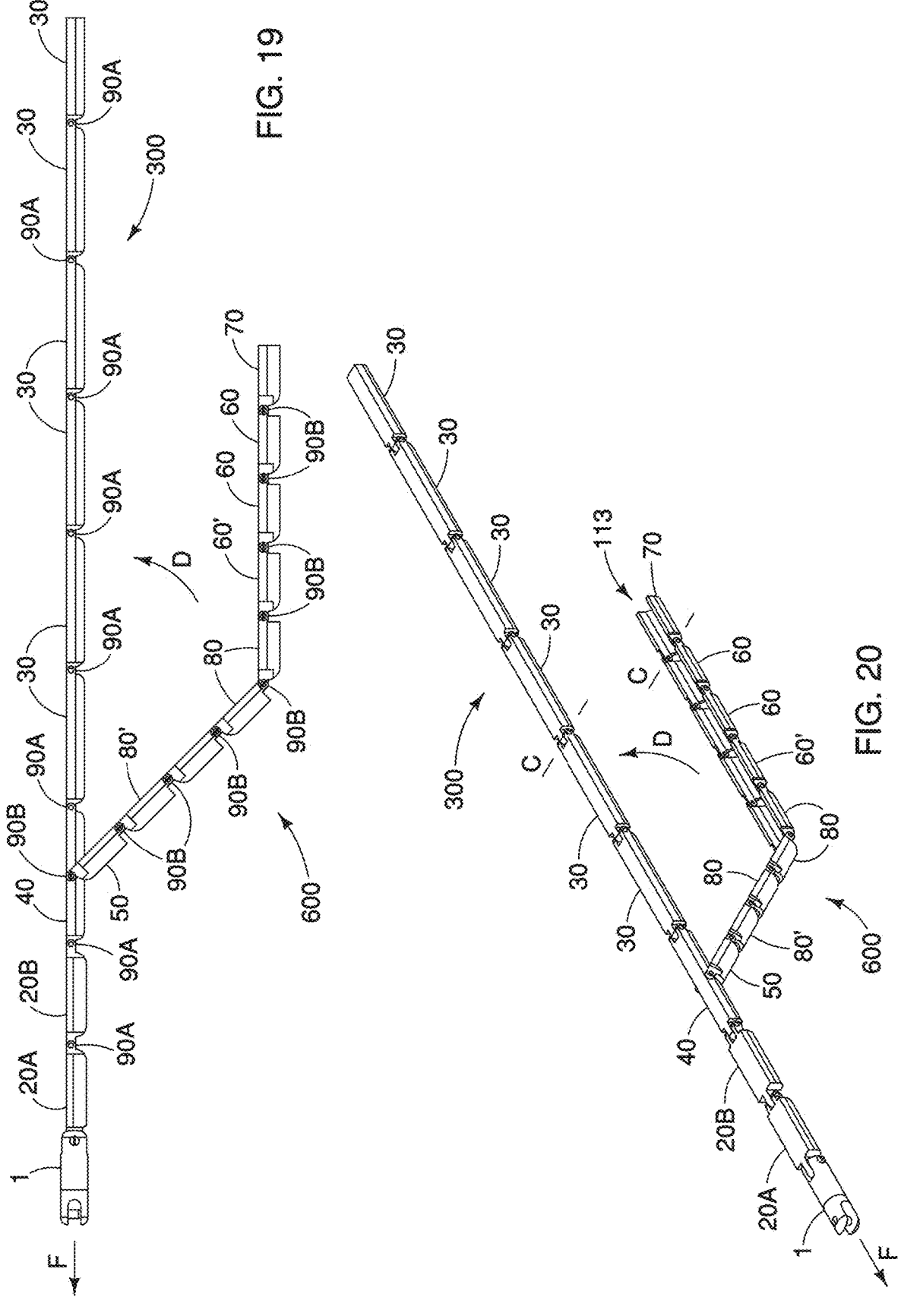
FIG. 19 is a side elevation view of a third embodiment of the anti-rotation device according to the present disclosure with one weighted tail partially upwardly rotated.
FIG. 20 is, in perspective view, the anti-rotation device of FIG. 19.
Figures 21, 22:
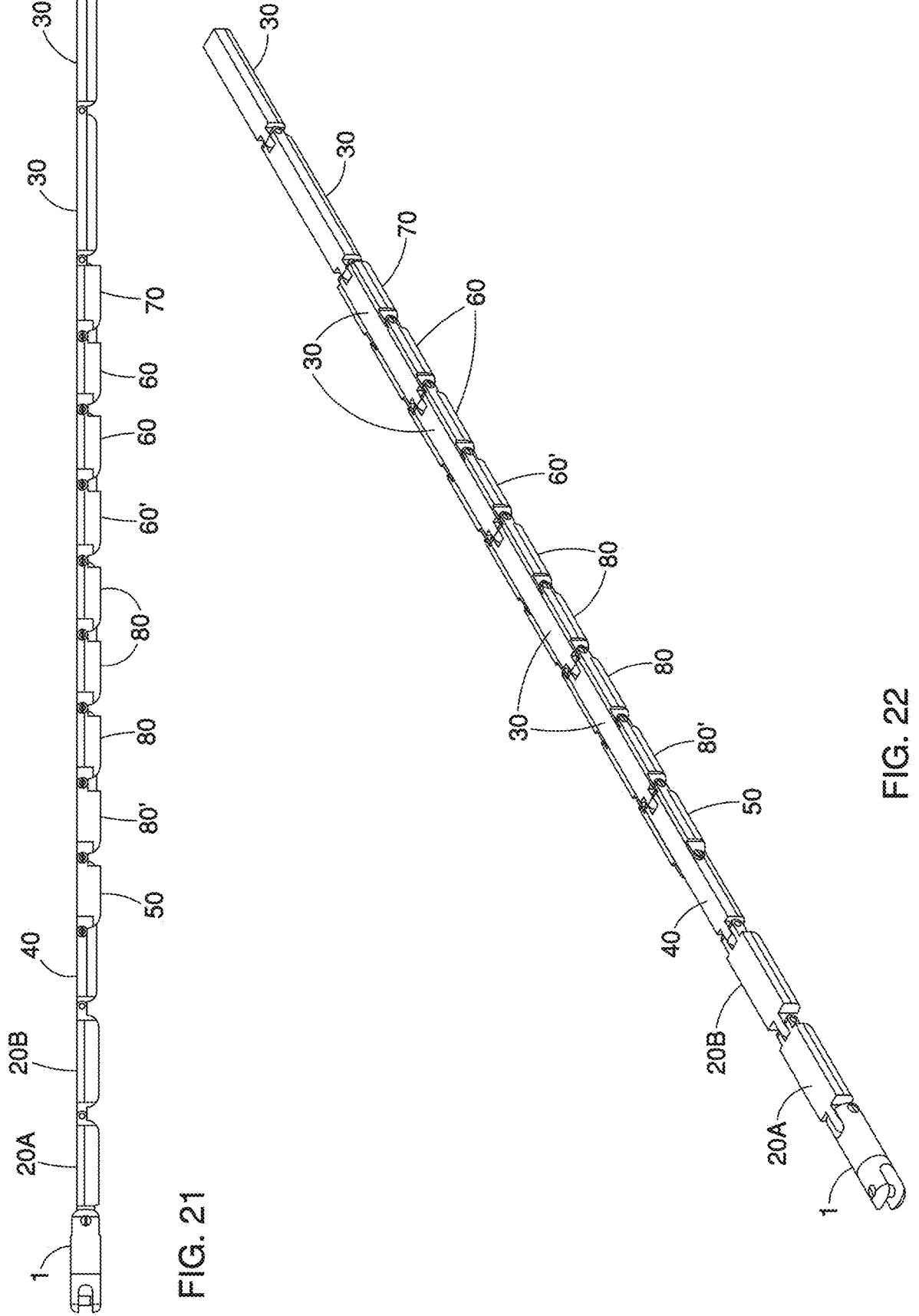
FIG. 21 is, in side elevation view, the anti-rotation device of FIG. 19 with the weighted tail fully upwardly rotated so as to nest the tow component in the storage channel formed in the weighted tail.
FIG. 22 is, in perspective view, the anti-rotation device of FIG. 21.
Figure 23:
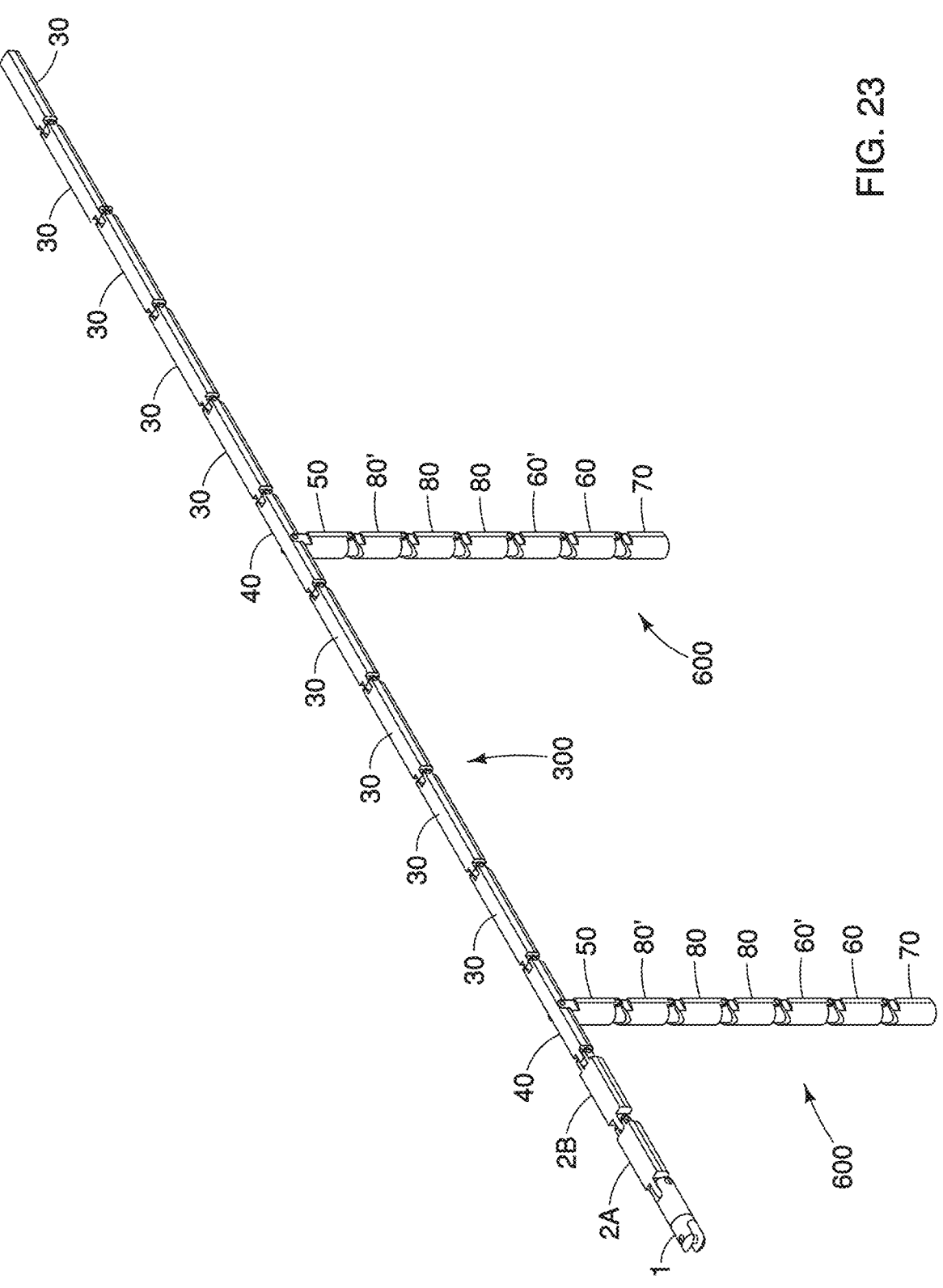
FIG. 23 is, in perspective view, the anti-rotation device of FIG. 19 showing the tow component having two, shorter, weighted tails suspended therefrom.

In the third embodiment, and as seen in FIGS. 19-34, tow component 300 includes, from left to right in FIG. 19, and connected by pinned hinges 90A, swivel 1 connected to front tow leader section 20A, which is connected to back tow leader section 20B, which is connected to tail connector link 40, which is connected to five end-to-end connected tow sections 30, wherein it is understood that the downstreammost tow section 30 may be connected to the upstream end of a conductor (not shown) by means known in the art, or wherein the tow component 300 and tail 600 of FIG. 19 forms part of a larger anti-rotation device 100 that is longer and has more than one tail 600 such as seen by way of example in FIG. 23. Tail connector section 50 is pivotally mounted to, midway along, tail connector link 40 by pivoting couplings 90B. Insulated tail sections 80 are mounted end-to-end to each other by pivoting couplings 90B. The upstream, top-most insulated tail section 80' is pivotally coupled by pivoting couplings 90B at its upstream end to tail connector section 50 and at its downstream end to the adjacent insulated tail section 80. The upstream weighted tail section 60' is pivotally coupled by pivoting couplings 90B to the downstream-most insulated tail section 80 and to the adjacent weighted tail section 60. The weighted tail sections 60 are pivotally coupled end-to-end by pivoting couplings 90B. The downstream-most weighted tail section 60 is pivotally coupled to end weighted tail section 70.

Pivoting couplings 90B are each an oppositely disposed pair of hinge elements 110 oppositely disposed on either side of tow component storage channel 113. Thus, as seen by way of example in FIG. 34B, hinge elements 110 may be flush mounted short bolts threaded into corresponding recessed nuts (not shown) recessed into the interior of the side walls of tail sections 60, 70 and 80, wherein in FIG. 34B only the heads of the pair of bolts may be seen. As would be known to one skilled in the art, other forms of hinge elements 110 will also work, so long as the elongate channel in each of the tail sections, which collectively form storage channel 113, is kept free of obstructions. Thus, tow component storage channel 113 is formed in and entirely along, collectively and in order of their sequencing, tail connector section 50, insulated tail sections 80, weighted tail sections 60 and end tail section 70. Hinge elements 110 are pairs of hinge components, such as the above-described bolts and nuts, which are aligned laterally across, and laterally separated by the width of, the storage channel 113 to form hinges allowing only bending in the plane of bending A.

In operation, as tow component 300 is pulled in direction F over sheave 400 as described above and shown in respect of the second embodiment in FIG. 4 (which applies equally to the third embodiment), weighted tail 600 rotates up in direction D as the weighted tail enters the sheave. As the weighted tail 600 rotates up it engages the tow component 300. The tow component 300 in the third embodiment then nests into the storage channel 113; and in particular the downstream end of tail connector link 40 first nests snugly into the corresponding length of storage channel 113 in tail connector section 50, followed by the tow sections 30 one-by-one nesting into the corresponding length of storage channel 113 in insulated tail sections 80 and then weighted tail sections 60, and lastly into end tail section 70. That is; first to nest is tail connector link 40, then, sequentially, tow sections 30.

In this third embodiment, and without intending to be limiting, storage channel 113 is, when tail 600 is straight, formed as a linear, rounded bottom half-cylindrical, or something substantially similar that has other than a U-shape in cross-section, so long as storage channel 113 is shaped to snugly receive the lower surface of the various sections of the tow component 300. The lower surface of the various sections of tail 600; namely, sections 50, 60, 70, and 80, are also rounded bottomed or half-cylindrical or of such an outer shape so long as shaped to substantially conform to the cross-sectional shape of the inner surface of the annular groove of sheave 400. In the illustrated example, the cross sections of storage channel 113 in FIGS. 31B, 32B, 33B have oppositely disposed, opposed facing interior side surfaces rising from the interior surface of the rounded bottom. The lower exterior surfaces of the tail sections also have a rounded bottom, so as to form a rounded bottom along the full length of the tail 600. Tow component 300 thus fits snugly into the full length of storage channel 113, which corresponds to the fully assembled length of tail 600.

Tail 600, when fitted over the corresponding lower surface of tow component 300, fits snugly into the annular groove of sheave 400 as it passes over the sheave. Once the tow component 300, with the weighted tail 600 fitted thereunder, is pulled in direction F so as to be clear of sheave 400, the weighted tail 600 swings down under its own weight, in a direction opposite to direction F, to return to the vertical.

As in the previous embodiments, both the tow component 300 and the weighted tail 600 are constrained to only bend in the plane of bending A. Pinned hinges 90A and pivoting couplings 90B constrain the bending to only the plane of bending A by only themselves allow pivoting about their axes of rotation C. The axes of rotation C are, as described above, orthogonal to the plane of bending A. Applicant postulates that the laterally spaced apart pairs of hinge elements 110 may lend improved resistance to the above-described tail whipping effect. In the third embodiment the hinge elements 110 are laterally spaced further apart, being on either side of storage channel 113 (itself sized to receive the tow component 300) and thus more stable and resistant to bending out of the plane of bending A and tearing than the whipping resistive structure (for example the cumulative width of the hinge formed by male flange 4A mated within its corresponding female receiving flanges 3B as seen in FIG. 8) within the hinges in the first two embodiments above.

The previous description of the disclosed embodiments is provided to enable any person skilled in the art to make or use the present disclosure. Various modifications to those embodiments will be readily apparent to those skilled in the art, and the generic principles defined herein may be applied to other embodiments without departing from the spirit or scope of the disclosure. Thus, the present disclosure is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. An anti-rotation device to resist twisting of a cable or wire as it is strung through a transmission/distribution network, said device comprising a tow component connectable to the cable or wire at one end, and at least one electrically insulated weighted tail pivotally suspended from the tow component and having a storage channel formed and sized to nest a length of the tow component therein, wherein the at least one tail includes at least one weighted tail section and at least one electrically insulated tail section removably and pivotally connected end-to-end to one another, the at least one tail positioned along the tow component so that the tow-component is completely nested in and along the storage channel in the at least one tail as the tow component and the east one tail are pulled through a sheave during the stringing of the cable or wire, wherein said device is produced by the process of:

a) determining a peak rotational force twisting moment of the cable or wire as it is strung through the transmission/distribution network;

b) determining a length and distributed weight requirement for the at least one tail to produce a counter-moment, substantially more than or equal to and counter to the rotational force twisting moment of the cable or wire;

c) providing (i) a number of the weighted tail sections, wherein the number of the weighted tail sections is determined to meet the length and weight requirement of the at least one tail, and wherein the width of the tow component is constrained by the width of the storage channel in the at least one tail and the width of the at least one tail is constrained by the width of an annular groove around the sheave, wherein the length and width of the at least one tail and the material and hence weight of each weighted tail section within the least one tail is determined by the distributed weight requirement to produce the required counter-moment produced by the at least one tail, and wherein the weighted tail sections are adapted for end-to-end connection to one another, (ii) the at least one electrically insulated tail section adapted for end-to-end connection to the weighted tail sections; and d) connecting the weighted tail sections and the at least one electrically insulated tail section so as to position the at least one electrically insulated tail section adjacent the tow component, interleaved between the tow component and the weighted tail sections.

2. The anti-rotation device produced by the process of claim 1, wherein the tow component is comprised of one or more tow sections releasably and pivotally connected to one another and constrained by hinged connections for rotation relative to one another only in a single plane of bending of the tow component, and wherein the at least one tail is a plurality of tails spaced apart in a spaced array along the tow component, each of the tails including a series of insulated tail sections and weighted tail sections pivotally connected end-to-end to one another and constrained by hinged connections between the tail sections for rotation relative to one another and to the tow component only in the single plane of bending of the tow component.

3. The anti-rotation device produced by the process of claim 1, wherein the at least one electrically insulated tail section is located immediately adjacent and adjoined to the tow component.

4. The anti-rotation device produced by the process of claim 1, wherein the at least one electrically insulated tail section is comprised of materials selected from the group of dielectric materials which include plastics, fibreglass, ceramic, aramid fibres.

5. The anti-rotation device produced by the process of claim 1, wherein the at least one electrically insulated tail section has a cumulative insulated length and the stone weighted tail section has a cumulative weighted length, and wherein the ratio of the cumulative insulated length to the cumulative weighted length is chosen from the range of between 1:1 and 4:1.

6. The anti-rotation device produced by the process of claim 1, wherein the at least one electrically insulated tail sections and the at least one weighted tail section provide articulation only in a plane-of-bending of the tow component so that the tow component remains in alignment with the storage channel in the at least one tail when pulled through the sheave.

7. The anti-rotation device produced by the process of claim 1, wherein the at least one tail is formed as an u-shaped channel.

8. An anti-rotation device for resisting twisting of a cable or wire as it is strung in a stringing direction from an upstream end to a downstream end through a transmission/distribution network, the device comprising:

a) a tow component adapted to be connected to the cable or wire wherein the tow component includes a plurality of tow sections;

b) at least one Ix insulated weighted tail suspended from and pivotally mounted to the tow component, and wherein, where the at least one tail is a plurality of tails, the plurality of tails are pivotally mounted in a spaced apart array along the tow component, for pivotal rotation of the tails between a suspended position suspended below the tow component and a pivoted position flush along the tow component, wherein each of the at least one tail includes:

(i) at least one weighted tail section; and (ii) at least one electrically insulated tail section connected end-to-end to the at least one weighted tail section, between the at least one weighted tail section and the tow component; and wherein the spaced apart array of tails are spaced along the tow component such that a first length of the tow component between adjacent first and second tails is at least equal in length to a length of the first tail, wherein the first tail is upstream of the second tail in the stringing direction, and wherein the tail sections each have a storage channel formed therein so as to form a continuous linear storage channel when the tails are suspended from the tow component, so that as the tails pivot to rotate upwardly they engage, partially encase and lie flush along the tow component, the tail sections in each tail thereby collectively forming the continuous linear storage channels having a width and a length along the tails, and wherein the width of the tow component is constrained by the width of the continuous linear storage channels in the tails so that the tails snugly receive a corresponding length of the tow component in their continuous linear storage channels as the tow component and the tails pass over a traveler or sheave in the network during the stringing, and wherein the length and width of each tail and the material of each tail section of each tail determines a weight distribution of, and the amount of counter-moment produced by, each tail, and each tail is adapted to provide a counter-moment, counter to the rotational twisting of the cable or wire.

9. The anti-rotation device of claim 8, wherein the plurality of tow sections are releasably and pivotally connected end-to-end to one another for rotation relative to one another only in a plane of bending of the tow component.

10. The anti-rotation device of claim 9, wherein the electrically insulated tail sections are located adjacent the tow component and the weighted tail sections are suspended from the electrically insulated tail sections, and wherein the tail sections are constrained for rotation relative to one another and relative to the tow component only in the plane of bending of the tow component.

11. The anti-rotation device of claim 8, wherein the insulated tail sections are comprised of materials selected from the group of dielectric materials which include plastics, fibreglass, ceramic, aramid fibres.

12. The anti-rotation device of claim 8, wherein the at least one electrically insulated tail section includes a plurality of contiguously pivotally end-to-end mounted electrically insulated tail sections.

13. The anti-rotation device of claim 8, wherein the tails and the tow sections are said pivotally mounted by pivoting hinges between each of the tow sections and an uppermost end of each of the tails so as to articulate only in the plane of bending, to thereby keep the tow component in alignment with the continuous linear storage channel in each of the tails when the tow component is pulled through a traveler or sheave.

14. The anti-rotation device of claim 8, wherein the tails are formed as u-shaped channels.

15. The anti-rotation device of claim 8, wherein, for each tail, the electrically insulated tail sections have a cumulative insulated length and the weighted tail sections have a cumulative weighted length, and wherein the ratio of the cumulative insulated length to the cumulative weighted length is in the range of 1:1 to 4:1.

\* \* \* \* \*